US010536966B2

(12) United States Patent
Liu et al.

(10) Patent No.: US 10,536,966 B2
(45) Date of Patent: Jan. 14, 2020

(54) PHYSICAL DOWNLINK CONTROL CHANNEL AND HYBRID AUTOMATIC REPEAT REQUEST FEEDBACK FOR MULTEFIRE COVERAGE ENHANCEMENT

(71) Applicant: QUALCOMM Incorporated, San Diego, CA (US)

(72) Inventors: Chih-Hao Liu, San Diego, CA (US); Tamer Kadous, San Diego, CA (US); Srinivas Yerramalli, San Diego, CA (US); Chirag Sureshbhai Patel, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 15/811,335

(22) Filed: Nov. 13, 2017

(65) Prior Publication Data

US 2018/0167968 A1 Jun. 14, 2018

Related U.S. Application Data

(60) Provisional application No. 62/432,460, filed on Dec. 9, 2016.

(51) Int. Cl.
*H04W 4/00* (2018.01)
*H04W 72/14* (2009.01)
(Continued)

(52) U.S. Cl.
CPC ........... *H04W 72/14* (2013.01); *H04L 1/1812* (2013.01); *H04L 1/1861* (2013.01);
(Continued)

(58) Field of Classification Search
CPC ......... H04W 72/0446; H04W 72/0406; H04W 72/042; H04W 72/12; H04W 72/1226; H04W 16/14; H04L 1/1812; H04L 1/1861
See application file for complete search history.

(56) References Cited

U.S. PATENT DOCUMENTS 8,295,304 B1 * 10/2012 Smidth ................. H04W 28/22 370/468
9,363,798 B2 * 6/2016 Lee ......................... H04L 5/001
(Continued)

OTHER PUBLICATIONS

International Search Report and Written Opinion—PCT/US2017/064019—ISA/EPO—dated Mar. 14, 2018.
(Continued)

*Primary Examiner* — Abdelnabi O Musa
(74) *Attorney, Agent, or Firm* — Holland & Hart LLP

(57) ABSTRACT

Techniques for wireless communication are described. One method includes assigning a downlink subframe that is a first occurring downlink subframe in a data frame; and transmitting an encoded control signal during a first transmission opportunity, the encoded control signal including a common portion for receiving devices, the common portion indicating a structure of the data frame, the encoded control signal further including a device specific portion for a specific receiving device, the device specific portion indicating uplink grants and downlink grants during the data frame for the specific receiving device, where at least the common portion of the encoded control signal is transmitted during the selected downlink subframe.

44 Claims, 20 Drawing Sheets

SF 0 210 SF 1 215 DL SF Repetition 220 PDCCH CeMPDCCH PDCCH eMPDCCH PDSCH PDSCH TxOP 205
SF 0 240 DL SF Repetition 220-a PDCCH CeMPDCCH 285 PDSCH PDSCH TxOP 235
SF 0 245 SF 1 250 DL SF Repetition 255 Special SF 260 UL SF 265 PDCCH CeMPDCCH PDCCH eMPDCCH PDSCH PDSCH S U U TxOP 240
105-a 290 290 115-a 115-b 205 200

(51) Int. Cl.
*H04L 1/18* (2006.01)
*H04W 72/12* (2009.01)
*H04W 16/14* (2009.01)

(52) U.S. Cl.
CPC ....... *H04W 72/1284* (2013.01); *H04L 1/1896* (2013.01); *H04W 16/14* (2013.01)

(56) References Cited

U.S. PATENT DOCUMENTS

| | | | | |
|---|---|---|---|---|
| 9,883,428 | B2 * | 1/2018 | Uemura | H04W 36/0083 |
| 9,893,863 | B2 * | 2/2018 | Takeda | H04W 72/042 |
| 10,200,173 | B2 * | 2/2019 | Guan | H04L 5/0051 |
| 2013/0010685 | A1 | 1/2013 | Kim et al. | |
| 2015/0282208 | A1 * | 10/2015 | Yi | H04W 72/121 370/329 |
| 2015/0289239 | A1 * | 10/2015 | Saito | H04L 5/001 370/329 |
| 2015/0304996 | A1 | 10/2015 | Yang et al. | |

OTHER PUBLICATIONS

Nokia et al., "On Two-Stage UL Scheduling for eLAA", 3GPP Draft; R1-167074, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 22, 2016-Aug. 26, 2016 Aug. 21, 2016, XP051125685, Retrieved from the Internet: URL:http://www.3gpp.org/ftp/Meetings_3GPP_SYNC/RAN1/Docs/ [retrieved on Aug. 21, 2016], 7 pages.

* cited by examiner

300

700

1100

1300

PHYSICAL DOWNLINK CONTROL CHANNEL AND HYBRID AUTOMATIC REPEAT REQUEST FEEDBACK FOR MULTEFIRE COVERAGE ENHANCEMENT

CROSS REFERENCES

The present Application for Patent claims priority to U.S. Provisional Patent Application No. 62/432,460 by LIU, et al., entitled "Physical Downlink Control Channel and Hybrid Automatic Repeat Request Feedback For MuLTEfire Coverage Enhancement," filed Dec. 9, 2016, assigned to the assignee hereof.

BACKGROUND

The following relates generally to wireless communication, and more specifically to physical downlink control channel (PDCCH) and hybrid automatic repeat request (HARQ) feedback for MuLTEfire coverage enhancement.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communications systems, a UE may include machine-type-communication (MTC) UEs that operate in a shared radio frequency spectrum band. In some cases, UEs may operate in a narrowband Internet-of-things (NB-IoT) deployment within a sub-GHz shared radio frequency spectrum band. Wireless communication systems serving Internet-of-things (IoT) devices have coverage expectations that are higher compared to existing solutions offered by shared radio frequency spectrum wireless communication systems. In some examples, extending coverage may include using licensed frequency spectrum band wireless communication systems. However, extending coverage areas for IoT devices using licensed radio frequency spectrum may be too costly for industries with IoT deployments.

SUMMARY

The described techniques relate to improved methods, systems, devices, or apparatuses that support physical downlink control channel (PDCCH) and hybrid automatic repeat request (HARQ) feedback for MuLTEfire coverage enhancement. Configuring a PDCCH frame structure may include adjusting an enhanced PDCCH (ePDCCH) to have an improved enhanced machine-type PDCCH (eMPDCCH) waveform. For existing legacy PDCCH, the PDCCH occupies one subframe (SF) and supports two sets of physical resource block pairs. A physical resource block is a unit of transmission resource including 12 sub-carriers in the frequency domain and 1 timeslot (0.5 ms) in the time domain. Each set may include 2, 4, or 8 physical resource block pairs.

One physical resource block pair may transport four control channel elements. The legacy PDCCH therefore may transport a total of 32 control channel elements per set, which may be insufficient to satisfy a target signal-to-noise ratio (SNR) value (e.g., −14 dB) and aggregation level (e.g., aggregation level of 64). In some examples, by assigning the size of the PDCCH to support two sets of physical resource block pairs such that each set may support 32 physical resource block pairs, a target SNR value and aggregation level may be achieved. As a result, the 32 physical resource block pairs may transport 128 control channel elements. In some examples, 128 control channel elements may support two candidates of aggregation level 64. Since two sets exist, the eMPDCCH may support up to four candidates of aggregation level 64.

A method for wireless communication at a base station is described. The method may include assigning a downlink subframe that is a first occurring downlink subframe in a data frame; and transmitting an encoded control signal during a first transmission opportunity, the encoded control signal including a common portion for receiving devices, the common portion indicating a structure of the data frame, the encoded control signal further including a device specific portion for a specific receiving device, the device specific portion indicating uplink grants and downlink grants during the data frame for the specific receiving device, wherein at least the common portion of the encoded control signal is transmitted during the selected downlink subframe.

An apparatus for wireless communication at a base station is described. The apparatus may include a processor, memory in electronic communication with the processor, and instructions stored in the memory. The instructions may be operable to cause the processor to assign a downlink subframe that is a first occurring downlink subframe in a data frame; and transmit an encoded control signal during a first transmission opportunity, the encoded control signal including a common portion for receiving devices, the common portion indicating a structure of the data frame, the encoded control signal further including a device specific portion for a specific receiving device, the device specific portion indicating uplink grants and downlink grants during the data frame for the specific receiving device, wherein at least the common portion of the encoded control signal is transmitted during the selected downlink subframe.

Another apparatus for wireless communication at a base station is described. The apparatus may include means for assigning a downlink subframe that is a first occurring downlink subframe in a data frame; and means for transmitting an encoded control signal during a first transmission opportunity, the encoded control signal including a common portion for receiving devices, the common portion indicating a structure of the data frame, the encoded control signal further including a device specific portion for a specific receiving device, the device specific portion indicating uplink grants and downlink grants during the data frame for the specific receiving device, wherein at least the common portion of the encoded control signal is transmitted during the selected downlink subframe.

A non-transitory computer readable medium for wireless communication is described. The non-transitory computer-readable medium may include instructions operable to cause a processor to assign a downlink subframe that is a first occurring downlink subframe in a data frame; and transmit an encoded control signal during a first transmission opportunity, the encoded control signal including a common portion for receiving devices, the common portion indicating a structure of the data frame, the encoded control signal further including a device specific portion for a specific receiving device, the device specific portion indicating uplink grants and downlink grants during the data frame for the specific receiving device, wherein at least the common portion of the encoded control signal is transmitted during the selected downlink subframe.

Some examples of the method, apparatus, and non-transitory computer-readable medium described above may further include processes, features, means, or instructions for transmitting a shared data signal during a plurality of downlink subframes during the first transmission opportunity; and transmitting the shared data signal during a second transmission opportunity that is subsequent to the first transmission opportunity.

Some examples of the method, apparatus, and non-transitory computer-readable medium described above may further include processes, features, means, or instructions for associating a trigger bit with the common portion of the encoded control signal, the trigger bit indicating a continuing transmission of the shared data signal; and transmitting the trigger bit with the common portion of the encoded control signal during a downlink subframe that is a first occurring downlink subframe in the data frame during the second transmission opportunity.

Some examples of the method, apparatus, and non-transitory computer-readable medium described above may further include processes, features, means, or instructions for associating a trigger bit with the common portion of the encoded control signal, the trigger bit indicating a continuing reception of the shared data signal; and transmitting the trigger bit with the common portion of the encoded control signal during a downlink subframe that is a first occurring downlink subframe in the data frame during the second transmission opportunity.

In some examples of the method, apparatus, and non-transitory computer-readable medium described above, the device specific portion of the encoded control signal indicates a quantity of repetitive transmissions of a shared data signal that occurs during downlink subframes of the data frame. In some examples of the method, apparatus, and non-transitory computer-readable medium described above, the shared data signal comprises a physical downlink shared channel (PDSCH).

In some examples of the method, apparatus, and non-transitory computer-readable medium described above, the common portion of the encoded control signal identifies an uplink subframe of the data frame during which a receiving device is to transmit an acknowledgement (ACK) signal.

Some examples of the method, apparatus, and non-transitory computer-readable medium described above may further include processes, features, means, or instructions for determining a quantity of downlink subframes or uplink subframes of the data frame based at least in part on a duration of the first transmission opportunity. Some examples of the method, apparatus, and non-transitory computer-readable medium described above may for determining the quantity of downlink subframes or uplink subframes of the data frame is based at least in part on a subframe configuration parameter.

Some examples of the method, apparatus, and non-transitory computer-readable medium described above, determining the number of downlink subframes or uplink subframes of the data frame, may further include processes, features, means, or instructions for determining a SNR threshold; and determining the quantity of downlink or uplink subframes based at least in part on the SNR threshold.

In some examples of the method, apparatus, and non-transitory computer-readable medium described above, the encoded control signal is an eMPDCCH. In some examples of the method, apparatus, and non-transitory computer-readable medium described above, the common portion and the device specific portion comprise at least one of a PDCCH, an eMPDCCH, and a common eMPDCCH (CeMPDCCH), or a combination thereof.

Some examples of the method, apparatus, and non-transitory computer-readable medium described above may further include processes, features, means, or instructions for assigning a set size of the data frame to a predetermined number of physical resource block pairs based at least in part on an aggregation level. In some examples of the method, apparatus, and non-transitory computer-readable medium described above, the predetermined number of physical resource block pairs is 32. In some examples of the method, apparatus, and non-transitory computer-readable medium described above, the aggregation level is 64 or higher.

A method for wireless communication at a user equipment is described. The method may include receiving an encoded control signal in a data frame that comprises a common portion and a device specific portion during a first transmission opportunity; identifying that the encoded control signal is received during a downlink subframe that is a first occurring downlink subframe in the data frame; and decoding the encoded control signal in the first occurring downlink subframe in the data frame.

An apparatus for wireless communication at a base station is described. The apparatus may include a processor, memory in electronic communication with the processor, and instructions stored in the memory. The instructions may be operable to cause the processor to receive an encoded control signal in a data frame that comprises a common portion and a device specific portion during a first transmission opportunity; identify that the encoded control signal is received during a downlink subframe that is a first occurring downlink subframe in the data frame; and decode the encoded control signal in the first occurring downlink subframe in the data frame.

Another apparatus for wireless communication at a base station is described. The apparatus may include means for receiving an encoded control signal in a data frame that comprises a common portion and a device specific portion during a first transmission opportunity; means for identifying that the encoded control signal is received during a downlink subframe that is a first occurring downlink subframe in the data frame; and means for decoding the encoded control signal in the first occurring downlink subframe in the data frame.

A non-transitory computer readable medium for wireless communication is described. The non-transitory computer-readable medium may include instructions operable to cause a processor to receive an encoded control signal in a data frame that comprises a common portion and a device specific portion during a first transmission opportunity; identify that the encoded control signal is received during a downlink subframe that is a first occurring downlink subframe in the data frame; and decode the encoded control signal in the first occurring downlink subframe in the data frame.

Some examples of the method, apparatus, and non-transitory computer-readable medium described above, decoding the encoded control signal, may further include processes, features, means, or instructions for decoding the common portion that indicates the structure of the data frame; and decoding the device specific portion that indicates uplink grants and downlink grants during the data frame.

Some examples of the method, apparatus, and non-transitory computer-readable medium described above may further include processes, features, means, or instructions for receiving a shared data signal during a plurality of downlink subframes during the first transmission opportunity; and receiving the shared data signal during a second transmission opportunity that is subsequent to the first transmission opportunity.

Some examples of the method, apparatus, and non-transitory computer-readable medium described above, receiving the shared data signal, may further include processes, features, means, or instructions for decoding a trigger bit from the common portion of the encoded control signal during the second transmission opportunity, the trigger bit indicating a continuing transmission of the shared data signal; and receiving the decoded trigger bit with the common portion of the encoded control signal during a downlink subframe that is a first occurring downlink subframe in the data frame during the second transmission opportunity.

In some examples of the method, apparatus, and non-transitory computer-readable medium described above, the device specific portion of the encoded control signal indicates a quantity of repetitive transmissions of a shared data signal that occurs during downlink subframes of the data frame. In some examples of the method, apparatus, and non-transitory computer-readable medium described above, the shared data signal comprises a PDSCH.

Some examples of the method, apparatus, and non-transitory computer-readable medium described above, may further include processes, features, means, or instructions for transmitting an ACK signal during an uplink subframe of the data frame based at least in part on an indication in the common portion of the encoded control signal.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
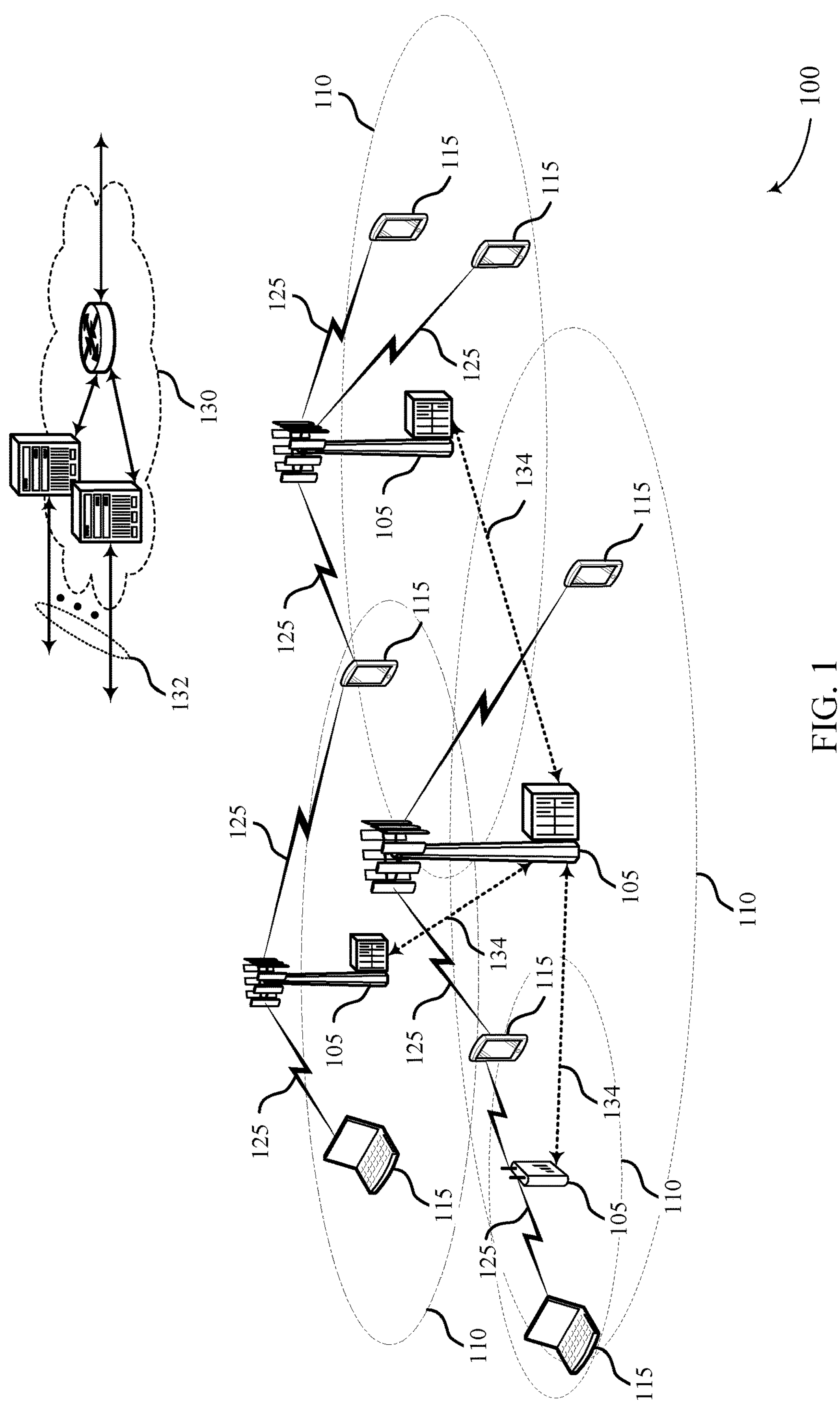
FIG. 1 illustrates an example of a system for wireless communication that supports PDCCH and HARQ for MuLTEfire coverage enhancement in accordance with aspects of the present disclosure.

Techniques are described that support configuring physical downlink control channel (PDCCH) frame structure and hybrid automatic repeat request (HARQ) feedback for coverage enhancement in a shared radio frequency spectrum. In some examples, the shared radio frequency spectrum may be used for Long Term Evolution (LTE) or LTE-Advanced (LTE-A) communications, Licensed Assisted Access (LAA) communications, enhanced LAA (eLAA) communications, or MuLTEfire communications. The shared radio frequency spectrum may be used in combination with, or independent from, a dedicated radio frequency spectrum. The dedicated radio frequency spectrum may include a radio frequency spectrum licensed to particular users for certain uses. The shared radio frequency spectrum may include a radio frequency spectrum available for Wi-Fi use, a radio frequency spectrum available for use by different radio access technologies (RATs), or a radio frequency spectrum available for use by multiple mobile network operators (MNOs) in an equally shared or prioritized manner.

In some examples, techniques for configuring PDCCH frame structure and HARQ feedback may enhance coverage for devices operating using shared frequency spectrum. Such wireless communications devices may include machine-type-communication (MTC) UEs that may operate in shared radio frequency spectrum band. In some cases, UEs may operate in a narrowband Internet-of-things (NB-IoT) deployment in a sub-GHz shared radio frequency spectrum band. Wireless communication systems that serve Internet-of-things (IoT) devices have coverage requirements that are higher compared to existing solutions offered by shared radio frequency spectrum. In some examples, extending coverage may include utilizing an un-shared frequency spectrum band. However, extending coverage area for IoT devices using un-shared (i.e., licensed) radio frequency spectrum may be too costly for industries with IoT deployments.

The techniques described herein may include configuring PDCCH frame structure and HARQ feedback to enhance coverage by utilizing wideband operation (e.g., 10 MHz or 20 MHz band) of the shared radio frequency spectrum. The wideband operation of the shared radio frequency spectrum may be used for MuLTEfire communications systems. In some examples, a MuLTEfire communications system may support UE with a coverage enhancement mode. Additionally, the MuLTEfire communication system may include and support different UE types. One UE type may be a legacy UE that may be deficient of capabilities related to a coverage enhancement mode. Another UE type may be a MuLTEfire UE that may possess capabilities related to a coverage enhancement mode.

In some examples, IoT devices deployed in industrial environments may necessitate a significantly higher coverage area than what is offered by existing Wi-Fi and MuLTEfire communication systems. For example, an automatic guided vehicle in industrial environments may have a bandwidth requirement of 150 kilobits per second (kbps). To improve coverage enhancement, a 16 dB gain may be provided for channels of a shared frequency spectrum band (i.e., Wi-Fi). MuLTEfire communications systems have a signal-to-noise ratio (SNR) of −6 dB. To enhance coverage for devices (e.g., IoT devices) in environments where these devices may be obstructed by objects or located at a cell edge from a base station, the MuLTEfire communication systems may improve a gain (extract 8 dB enhancement) of the system (Wi-Fi and MuLTEfire communication system) to satisfy an SNR target value (−14 dB).

MuLTEfire communications system may use legacy PDCCH for control signaling. Legacy PDCCH may support an aggregation level of eight. As a result, the SNR requirement associated with that aggregation level may be −6 dB. Legacy PDCCH may also support a number of control channel elements based on a number of OFDM symbols and a frequency spectrum band. For one OFDM symbol, legacy PDCCH transmission on a 10 MHz band may support 10 control channel elements. Two OFDM symbols for legacy PDCCH transmission on a 10 MHz band may support 27 control channel elements. Three OFDM symbols for legacy PDCCH transmission on a 10 MHz band may support 44 control channel elements.

For the 20 MHz band, one OFDM symbol may support 21 control channel elements, two OFDM symbols may support 55 control channel elements, and three OFDM symbols may support 88 control channel elements. To support coverage enhancement modes for MuLTEfire UEs (e.g., IoT devices), the wireless communication system may satisfy the SNR target value of −14 dB by achieving an aggregation level of 64. However, an aggregation level of 64 may consume all of the resources of the legacy PDCCH. Therefore, techniques are described herein that support configuring a PDCCH frame structure for coverage enhancement that satisfies the target SNR value of −14 dB and aggregation level of 64.

Configuring the PDCCH frame structure may include adjusting an enhanced PDCCH to have an improved eMPDCCH waveform. For existing legacy PDCCH, the PDCCH occupies one subframe and supports two sets of physical resource block pairs. A physical resource block may be a unit of transmission resource including 12 sub-carriers in the frequency domain and 1 timeslot (0.5 ms) in the time domain. Each set may include 2, 4, or 8 physical resource block pairs. One physical resource block pair may transport four control channel elements. The legacy PDCCH therefore may transport a total of 32 control channel elements per set, which is not enough to satisfy the target SNR value of −14 dB and aggregation level of 64. In some examples, by assigning or configuring the size of the PDCCH to extend the size of the two sets such that each set may support 32 physical resource block pairs, the target SNR value and aggregation level may be realized. As a result, the 32 physical resource block pairs may transport 128 control channel elements. In some examples, 128 control channel elements may support two candidates of aggregation level 64. Since two sets exist, the eMPDCCH may support up to four candidates of aggregation level 64.

A wireless communication device may allocate the four candidates for a common search space (e.g., IoT devices in MuLTEfire communications systems) and UE specific search space (i.e., target for specific legacy UEs). In some examples, a wireless communication device may switch to a Cell-specific Reference Signal (CRS) transmission mode based on the eMPDCCH configuration. By modifying the existing legacy PDCCH to the eMPDCCH, a geographic coverage for a wireless communication device may be enhanced. As a result, the wireless communication device may broadcast control signals to other devices (e.g., IoT devices UE) previously at an edge or outside the geographic coverage area.

Aspects of the disclosure are further illustrated by and described with reference to apparatus diagrams, system diagrams, and flowcharts that relate to PDCCH and HARQ feedback for MuLTEfire coverage enhancement.

FIG. 1 illustrates an example of a system 100 for wireless communication that supports PDCCH and HARQ request feedback for MuLTEfire coverage enhancement in accordance with aspects of the present disclosure. The system 100 includes base stations 105, UEs 115, and a core network 130. In some examples, the system 100 may be a LTE (or LTE-Advanced) network, or a New Radio (NR) network. For example, the system 100 may include an LTE/LTE-A network, a MuLTEFire network, a neutral host small cell network, or the like, operating with overlapping coverage areas. A MuLTEFire network may include access points (APs) and/or base stations 105 communicating in an unlicensed radio frequency spectrum band, e.g., without a licensed frequency anchor carrier. For example, the MuLTEFire network may operate without an anchor carrier in the licensed spectrum. The system 100 may support configuring PDCCH and HARQ feedback to enhance coverage in the system 100. In some cases, the system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in the system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc. Base stations 105 may also be a MuLTEFire base station which may have limited or non-ideal backhaul links 134 with other base stations 105.

UEs 115 may be dispersed throughout the system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application.

Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. As mentioned above, in some cases position information for a MTC device may be provided that may allow a MTC device to be located, which may be beneficial for navigation or device location, for example. Furthermore, in cases where MTC devices use shared radio frequency spectrum, various techniques may support configuring PDCCH and HARQ feedback to enhance coverage to the MTC devices using shared radio frequency spectrum. In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and the system 100 may be configured to provide ultra-reliable communications for these functions.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one MME, at least one S-GW, and at least one P-GW. The mobile management entity (MME) may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, Internet Protocol (IP) connectivity, and other access, routing, or mobility functions. At least some of the network devices may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The system 100 may operate in an ultra-high frequency (UHF) frequency region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, the system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

The system 100 may support operation on multiple cells or carriers, a feature which may be referred to as carrier aggregation (CA) or multi-carrier operation. A carrier may also be referred to as a component carrier (CC), a layer, a channel, etc. The terms “carrier,” “component carrier,” “cell,” and “channel” may be used interchangeably herein. A UE 115 may be configured with multiple downlink CCs and one or more uplink CCs for carrier aggregation. Carrier aggregation may be used with both FDD and TDD component carriers. In some cases, the system 100 may utilize both licensed and shared or unlicensed radio frequency spectrum bands. For example, the system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. In some examples, the system 100 may employ MuLTEfire communications operating in a stand-alone manner using shared radio frequency spectrum. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some cases, the system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a network device, network device, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s$=1/30,720,000 seconds). Time resources may be organized according to radio frames of length of 10 ms ($T_f$=307200$T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases, the subframe may be the smallest scheduling unit, also known as a TTI. In other cases, a TTI may be shorter than a subframe or may be dynamically selected (e.g., in short TTI bursts or in selected component carriers using short TTIs). A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

The system 100 may support operation on multiple cells or carriers, a feature which may be referred to as carrier aggregation (CA) or multi-carrier operation. A carrier may also be referred to as a component carrier (CC), a layer, a channel, etc. The terms “carrier,” “component carrier,” “cell,” and “channel” may be used interchangeably herein. A UE 115 may be configured with multiple downlink CCs and one or more uplink CCs for carrier aggregation. Carrier aggregation may be used with both FDD and TDD component carriers.

In some cases, the system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power). In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable.

In some cases, the system 100 may utilize both licensed and unlicensed radio frequency spectrum bands. For example, the system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
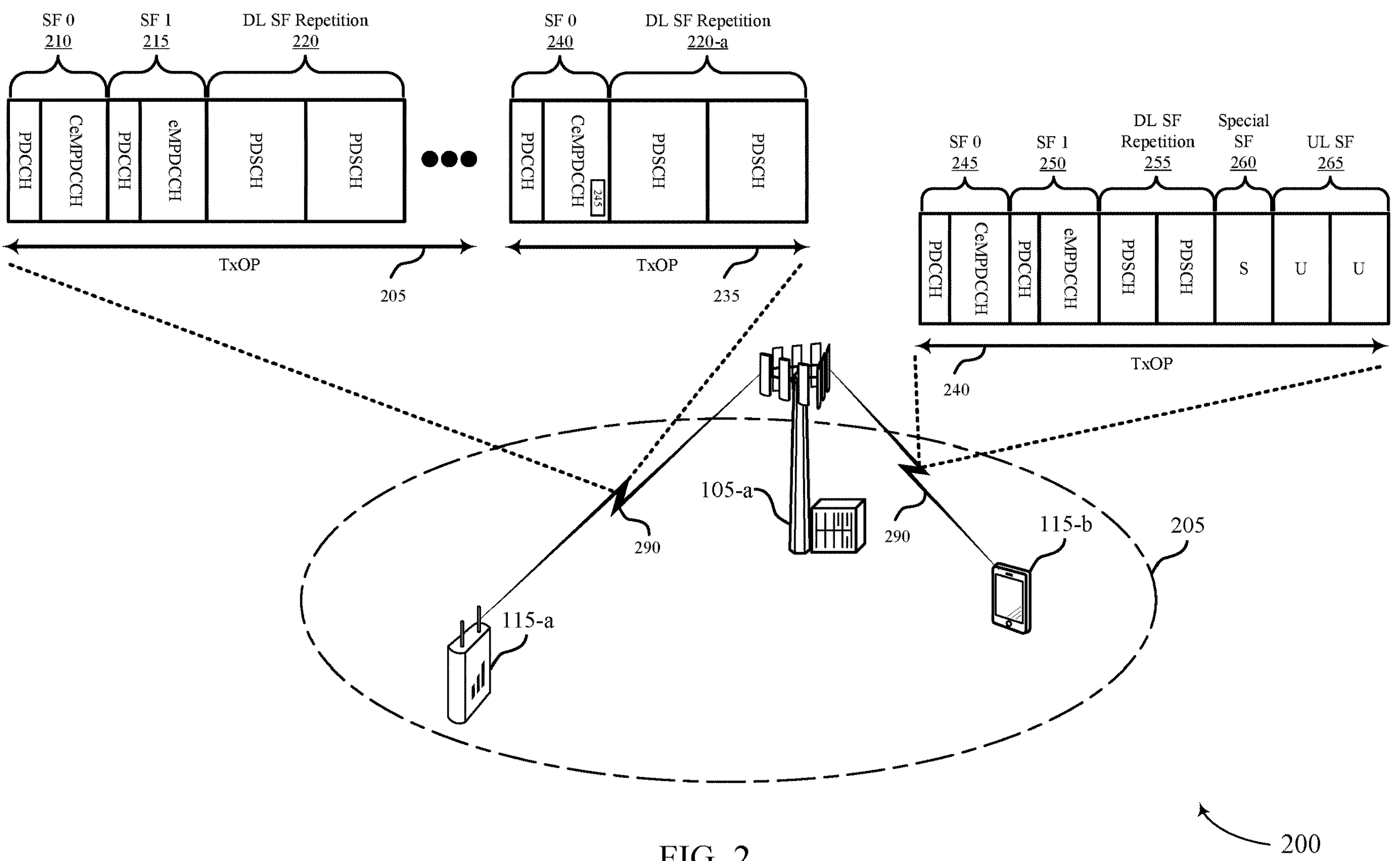
FIG. 2 illustrates an example of system for wireless communication that supports PDCCH and HARQ feedback for MuLTEfire coverage enhancement in accordance with aspects of the present disclosure.

FIG. 2 illustrates an example of a system 200 for wireless communication that supports PDCCH and HARQ feedback for MuLTEfire. The system 200 may include a base station 105-*a*, a UE 115-*a*, and a UE 115-*b*, which may be examples of a base station 105 and a UE 115 as described with reference to FIG. 1. In some cases, the UE 115-*a* may be a common type UE and the UE 115-*b* may be a specific type UE. Alternatively, the UE 115-*a* may be a specific type UE and the UE 115-*b* may be a common type UE.

The base station 105-*a* may encode a control signal that includes a common portion and a device specific portion. The common portion may indicate a structure of a data frame for the UE 115-*a* and the UE 115-*b*. The specific portion of the control signal may indicate uplink grants and downlink grants during the data frame. The base station 105-*a* may identify a downlink subframe, that may be a first occurring downlink subframe in the data frame, to encode the common portion and the specific portion.

In some cases, the base station 105-*a* may transmit the encoded control signal during a first transmission opportunity to the UE 115-*a* and the UE 115-*b*. The base station 105-*a* may transmit the common portion and the specific portion of the encoded control signal during the selected downlink subframe. In some examples, the base station 105-*a* may indicate a quantity of repetitive transmissions of a shared data signal that occurs during downlink subframes or uplink subframes of the data frame in the specific portion. The base station 105-*a* may also indicate an uplink subframe of the data frame during which the UE 115-*a* or the UE 115-*b* may transmit an acknowledgement/non-acknowledgement (ACK/NACK) signal.

In some examples, the base station 105-*a* may transmit a shared data signal during a plurality of downlink subframes during a first transmission opportunity. The base station 105-*a* may determine to transmit the shared data signal during a second transmission opportunity. In some cases, the second transmission opportunity may be subsequent to the first transmission opportunity. In one case, the shared data signal may include a PDSCH. The PDSCH may be used to transmit user data. In some cases, if the UE 115-*a* or the UE 115-*b* received the PDSCH data without errors, the UE 115-*a* or the UE 115-*b* may return an ACK/NACK in the uplink transmission. In another cases, the shared data signal may include a PUSCH. The UE 115-*a* or the UE 115-*b* may transmit user data to the base station 105-*a* via PUSCH. The PUSCH may include uplink control information including channel quality information (CQI), scheduling requests, and ACK/NACK responses for downlink control data signals.

In some examples, the base station 105-*a* may receive a shared data signal during a plurality of uplink subframes during the first transmission opportunity from the UE 115-*a* or the UE 115-*b*. The base station 105-*a* may continue to receive the shared data signal during a second transmission opportunity that may be subsequent to the first transmission opportunity. In case of the continued transmission of the shared data signal in a subsequent transmission opportunity, the base station 105-*a* may associate a trigger bit indicating a continuing transmission of the shared data signal to the UE 115-*a* or the UE 115-*b*. The base station 105-*a* may also associate a trigger bit to indicate a continuing reception of a shared data signal. The trigger bit may be encoded in a common portion of the control signal. The base station 105-*a* may transmit the trigger bit in the common portion of the control signal during a downlink subframe that may be a first occurring downlink subframe in the data frame during the subsequent transmission opportunity.

The base station 105-*a* may determine a quantity of downlink subframes or uplink subframes of the data frame based on a duration of a transmission opportunity. For example, the base station 105-*a* may determine the quantity of downlink subframes or uplink subframes for a data frame based on a subframe configuration parameter. A subframe configuration parameter may include a threshold SNR. The base station 105-*a* may determine an SNR threshold value (e.g., −14 dB) and determine a quantity of downlink or uplink subframes based on the SNR threshold value.

In some cases, the base station 105-*a* may configure a set size of a data frame to a predetermined number of physical resource block pairs based on an aggregation level. In some cases, the base station 105-*a* may configure a PDCCH frame structure by adjusting an ePDCCH to have an improved eMPDCCH waveform. For existing PDCCH frame structure, the PDCCH may occupy one subframe and support two sets of physical resource block pairs. Each set may include 2, 4, or 8 physical resource block pairs. One physical resource block pair may transport four control channel elements. The existing PDCCH may as such transport a total of 16 control channel elements per set, which may not satisfy a target SNR value for example of −14 dB and aggregation level of 64.

In some examples, by configuring the size of the PDCCH to extend the size of the two sets such that each set may support 32 physical resource block pairs, a target SNR value and aggregation level may be achieved. As a result, the 32 physical resource block pairs may transport 128 control channel elements. In some examples, 128 control channel elements may support two candidates of aggregation level 64. Since two sets exist, the eMPDCCH may support up to four candidates of aggregation level 64. The base station 105-*a* may utilize the configured PDCCH (i.e., eMPDCCH) to enhance coverage to the UE 115-*a* and the UE 115-*b*.

The UE 115-*a* and the UE 115-*b* may receive the encoded control signal in a data frame from the base station 105-*a* via communication links 290. For example, the UE 115-*a* may receive a data frame including an encoded control signal during transmission opportunity 240. The UE 115-*a* may receive a first data frame including a first encoded control signal during a transmission opportunity 205 and a second data frame including a second encoded control signal during a transmission opportunity 235. After receiving the encoded control signal, the UE 115-*a* and the UE 115-*b* may decode the control signal to determine a structure of the data frame. The UE 115-*a* or the UE 115-*b* may identify that the encoded control signal is received during a downlink subframe. The downlink subframe may be a first occurring downlink subframe in a data frame associated with the encoded control signal. The UE 115-*a* or the UE 115-*b* may decode the encoded control signal in the first occurring downlink subframe in the data frame.

The UE 115-*a* may be a specific type UE and the UE 115-*b* may be a common type UE. In some examples, the UE 115-*a* may decode a common portion of the encoded control signal based on the UE 115-*a* being a common type UE (e.g., legacy UE). For example, the UE 115-*a* may decode a PDCCH of the common portion in a first subframe of a data frame. The decoded PDCCH of the common portion may indicate a structure of the data frame to the UE 115-*a*. The UE 115-*b* may alternatively decode a common portion and a device specific portion of the control signal based on the UE 115-*b* being a specific type UE (e.g., IoT device in a MuLTEFire network). In some cases, UEs in a coverage enhancement (CE) mode may decode a common enhanced machine-type PDCCH (CeMPDCCH) of the common portion to extract common signaling for a frame structure of the data frame. As a result, the UE 115-*b* may know the structure of the data frame and the uplink grants and downlink grants during the data frame based on the decoding.

In some examples, the UE 115-*a* may receive a data frame during a transmission opportunity 205. The received data frame at the UE 115-*a* may include a subframe 0 210, a subframe 1 215, and a downlink subframe repetition portion 220. In some cases, subframe 0 210 may be a common portion of the frame. The UE 115-*a* may decode subframe 0 210 that may be a downlink subframe that is a first occurring downlink subframe in the data frame for transmission opportunity 205. The subframe 0 210 may include a PDCCH and a CeMPDCCH. The CeMPDCCH may indicate a structure of the data frame for the UE 115-*a*. The structure of the data frame may indicate to the UE 115-*a* a quantity of downlink or uplinks subframes, special frames, etc. The PDCCH may support efficient data transmission in the system 200. In some cases, the PDCCH may transport a data control information (DCI) message. The DCI message may include resource assignments and other control information for the UE 115-*a*. For example, the DCI message may include a bitmap indicating resource block groups that are allocated to the UE 115-*a*. A resource block group may include a set of physical resource blocks. The physical resource blocks may indicate to the UE 115-*a* a quantity of subcarriers for a predetermined amount of time for transmission or reception.

Subframe 1 215 may be a device specific portion subframe. The UE 115-*a* may decode subframe 1 215 based on the UE 115-*a* capabilities (e.g., whether the UE 115-*a* is of a UE specific type). Subframe 1 215 may include a PDCCH and eMPDCCH. In some examples, subframe 1 215 may be a subsequent downlink subframe that is a second occurring downlink subframe in the data frame for transmission opportunity 205. The PDCCH of subframe 1 215 may also support efficient data transmission in the system 200. The PDCCH may transport a DCI message that includes resource assignments and other control information for the UE 115-*a*. The eMPDCCH of subframe 1 215 may include information indicating uplink grants and downlink grants for the UE 115-*a*.

The UE 115-*a* may receive a shared data signal during a plurality of downlink subframes during the first transmission opportunity. In some examples, the shared data signal may be received in downlink subframe repetition portion 220. Downlink subframe repetition portion 220 may include a quantity of repetitive transmissions of a shared data signal that occurs during downlink subframes. For example, downlink subframe repetition portion 220 may include two subframes transporting a PDSCH.

In some examples, the base station 105 may determine to continue transmitting the shared data signal during the transmission opportunity 235. In some cases, the UE 115-*a* may determine that the shared data signal is to be continued to be received during a subsequent transmission opportunity. For example, the UE 115-*a* may determine that the shared data signal is to be continued to be received during transmission opportunity 235. The UE 115-*a* may continue to receive the shared data signal during the transmission opportunity 235. The UE 115-*a* may receive a second data frame during transmission opportunity 235. In some examples, transmission opportunity 205 may have a different duration than transmission opportunity 235. Alternatively, transmission opportunity 205 and transmission opportunity 235 may have a same duration.

The second data frame may include a subframe 0 240 and a downlink subframe repetition portion 220-*a*. Subframe 0 240 may include a PDCCH and CeMPDCCH. Similar to subframe 0 210, the PDCCH may transport a DCI message that includes resource assignments and other control information for the UE 115-*a*. CeMPDCCH of subframe 0 240 may indicate uplink grants and downlink grants for the UE 115-*a*.

The UE 115-*a* may decode a trigger bit 245 in CeMPDCCH of subframe 0 240. Trigger bit 245 may indicate to the UE 115-*a* that a continuing transmission of the shared data signal is to occur. As a result, the UE 115-*a* may receive the trigger bit 245 with the common portion (i.e., CeMPDCCH) of the control signal during the downlink subframe (i.e., subframe 0 240). For examples, the UE 115-*b* may receive downlink subframe repetition portion 220-*a* based on decoding the trigger bit 245 of subframe 0 240. The downlink subframe repetition portion 220-*a* may include one or more subframes transporting PDSCH.

The UE 115-*b* may receive a data frame during a transmission opportunity 240. The data frame of transmission opportunity 240 may include a subframe 0 245, a subframe 1 250, a downlink subframe repetition portion 255, a special subframe 260, and an uplink subframes 265. UE 115-*b* may decode subframe 0 245 that may be a downlink subframe that is a first occurring downlink subframe in the data frame for transmission opportunity 240. The subframe 0 245 may include a PDCCH and a CeMPDCCH. The PDCCH may support efficient data transmission in system 200.

In some cases, the PDCCH may transport a DCI message. The DCI message may include resource assignments and other control information for the UE 115-*b*. For example, the DCI message may include a bitmap indicating resource block groups that are allocated to the UE 115-*b*. A resource block group may include a set of physical resource blocks. The physical resource blocks may indicate to the UE 115-*b* a quantity of subcarriers for a predetermined amount of time for transmission or reception. Alternatively, the CeMPDCCH may indicate a structure of the data frame for the UE 115-*b*. The structure of the data frame may indicate to the UE 115-*b* a quantity of downlink or uplinks subframes, special frames, etc.

Subframe 1 250 may be a device specific portion subframe. The UE 115-*b* may decode subframe 1 250 based on the UE 115-*b* capabilities (e.g., whether the UE 115-*b* is of a UE specific type). In some cases, the UE 115-*b* (e.g., Legacy UE) may decode a PDCCH in SF 1 250. The base station 105-*a* may transmit uplink and downlink grants (i.e., legacy grant for legacy PDSCH resource). In some cases, the grants may be located in different physical resource blocks than the subsequent eMPDCCH in the subframe (i.e., SF 1 250). Following subframes of the downlink subframe repetition portion (DL SF Repetition) 255, PDCCH for legacy UE may multiplex the previous subframes. For example, a first set of OFDM symbols (e.g., OFDM symbols 1-3) for PDCCH and a second set of OFDM symbols (e.g., OFDM symbols 4-14) for PDCCH. As a result, scheduled PDSCH for CE mode and legacy mode UE are placed in different physical resource blocks.

In some cases, the UE 115-*b* may be a common type UE and may not be capable to receive or decode subframe 1 250. Subframe 1 215 may include a PDCCH and eMPDCCH. Subframe 1 215 may in some examples be a subsequent downlink subframe that is a second occurring downlink subframe in the data frame for transmission opportunity 240. The PDCCH of subframe 1 250 may also support efficient data transmission in system 200. The PDCCH may transport a DCI message that includes resource assignments and other control information for the UE 115-*a*. The eMPDCCH of subframe 1 250 may include information indicating uplink grants and downlink grants for the UE 115-*a*.

The UE 115-*a* may receive a shared data signal during a plurality of downlink subframes during transmission opportunity 240. In some examples, the shared data signal may be received in downlink subframe repetition portion 255. Downlink subframe repetition portion 255 may include a quantity of repetitive transmissions of a shared data signal that occurs during downlink subframes. For example, downlink subframe repetition portion 255 may include two subframes transporting a PDSCH.

Special subframe 260 may include three fields. A first field may be a downlink pilot time slot, a second field may be a guard period, and a third field may be an uplink pilot time slot. In some cases, one or more fields of special subframe 260 may be configurable in length. The special subframe 260 may have length size threshold. For example, special subframe 260 may have length size threshold of 1 millisecond (ms). Additionally, uplink subframes 265 of the data frame of transmission opportunity 240 may include one or more uplink subframes for uplink transmissions. The UE 115-*b* may transmit an ACK signal during at least one of uplink subframes 265. In some cases, the UE 115-*b* may transmit an ACK signal during at least one of uplink subframes 265 based on an indication in CeMPDCCH of subframe 0 245.

The UE 115-*a* or the UE 115-*b* may also transmit a quantity of repetitive transmissions of PUSCH during uplink subframes of the data frame based on the device specific portion (e.g., eMPDCCH) of the control signal. In some examples, the UE 115-*a* or the UE 115-*b* may schedule system information block and indicate a number of repetition for the scheduled system information blocks.

Figure 3:
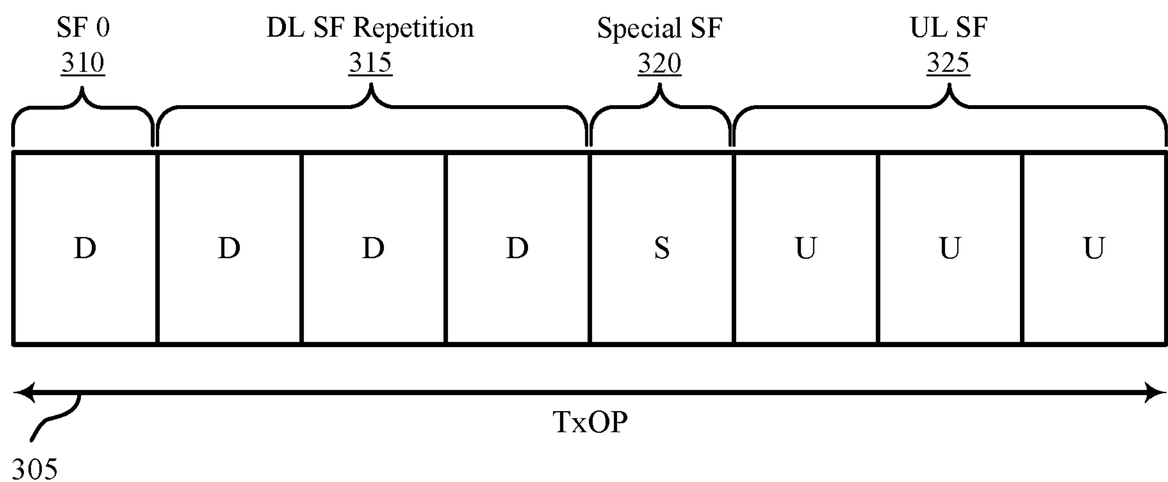
FIG. 3 illustrates an example of a data frame structure that supports PDCCH and HARQ feedback for MuLTEfire coverage enhancement in accordance with aspects of the present disclosure.

FIG. 3 illustrates an example of a data frame structure 300 that supports PDCCH and HARQ feedback for MuLTEfire coverage enhancement in accordance with aspects of the present disclosure. The data frame structure 300 may be a data frame for transmission or reception during a transmission opportunity 305. The data frame structure 300 may also be associated with a control signal. In some examples, the data frame structure 300 may include a quantity of downlink subframe bursts and uplink subframe bursts.

The data frame structure 300 may include a subframe 0 310, downlink subframe repetition portion 315, a special subframe 320, an uplink subframes 325. The subframe 0 310 in some cases may include a common portion and a device specific portion. The common portion may indicate a structure of a data frame to a UE (e.g., the UE 115). Additionally, the device specific portion may indicate uplink grants and downlink grants during transmission opportunity 305. In some cases, the subframe 0 310 may be a downlink subframe that is a first occurring downlink subframe of the data frame structure 300. The data frame structure 300 may also be configurable via CeMPDCCH.

The downlink subframe repetition portion 315 may include a shared data signal. For example, the shared data signal may be a PDSCH. The special subframe 320 may include three fields. A first field may be a downlink pilot time slot, a second field may be a guard period, and a third field may be an uplink pilot time slot. In some cases, one or more fields of the special subframe 320 may be configurable in length. The special subframe 320 may have length size threshold. For example, the special subframe 320 may have length size threshold of 1 ms. The uplink subframes 325 may include a quantity of subframes for uplink transmission. In some cases, the uplink subframes 325 may include a repetitive transmission of a shared data signal. For example, the uplink subframes 325 may each transport a PUSCH.

In some examples, the data frame structure 300 may be configurable by a base station (e.g., the base station 105). The data frame structure 300 may be configurable to support PDCCH and HARQ feedback for MuLTEfire coverage enhancement. The data frame structure 300 may be configurable based on one or more configuration parameters. For example, a configuration parameter may include, but is not limited to, a starting subframe, a quantity of downlink subframes $N_D$, a quantity of uplink subframes $N_U$, and a duration of a transmission opportunity. In one case, the data frame structure 300 may be configurable based on a duration of transmission opportunity 305. For example, transmission opportunity 305 may be 8 ms in duration and therefore subframes of the data frame structure 300 may be configured based on the 8 ms duration. Alternatively, transmission opportunity 305 may be 10 ms in duration; therefore, the data frame structure 300 may be configured based on the 10 ms duration.

Figure 4A:
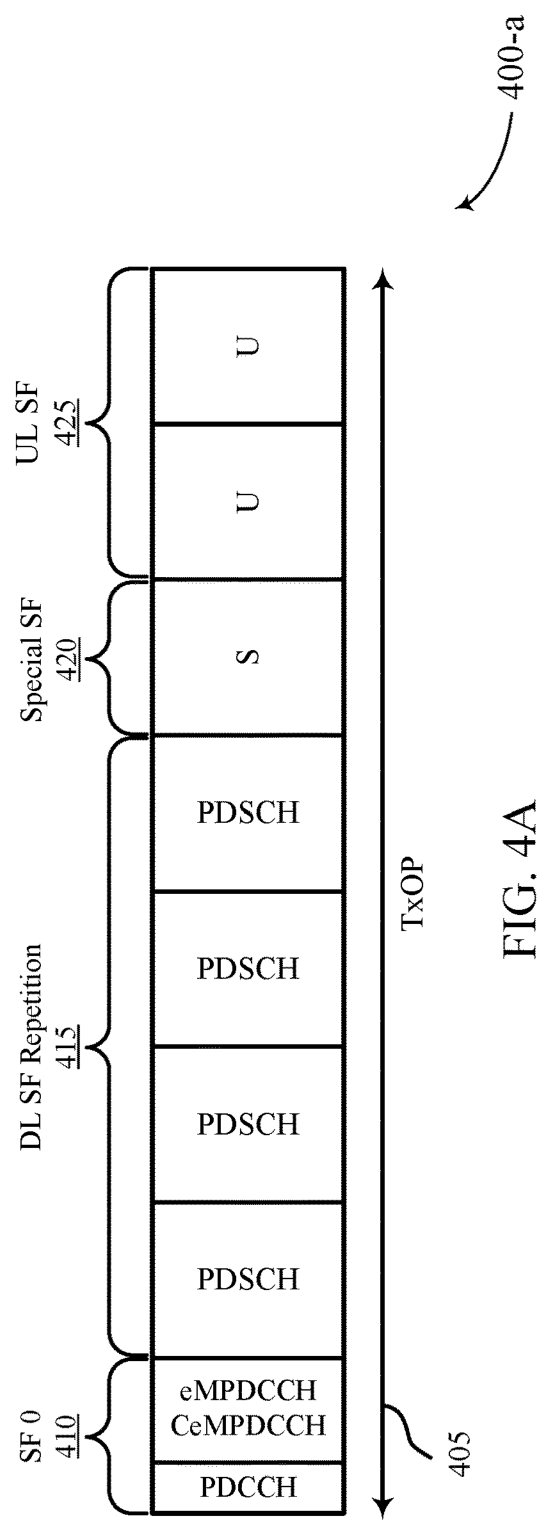
FIGS. 4A and 4B illustrate examples of a data frame structure that supports PDCCH and HARQ feedback for MuLTEfire coverage enhancement in accordance with aspects of the present disclosure.
Figure 4B:
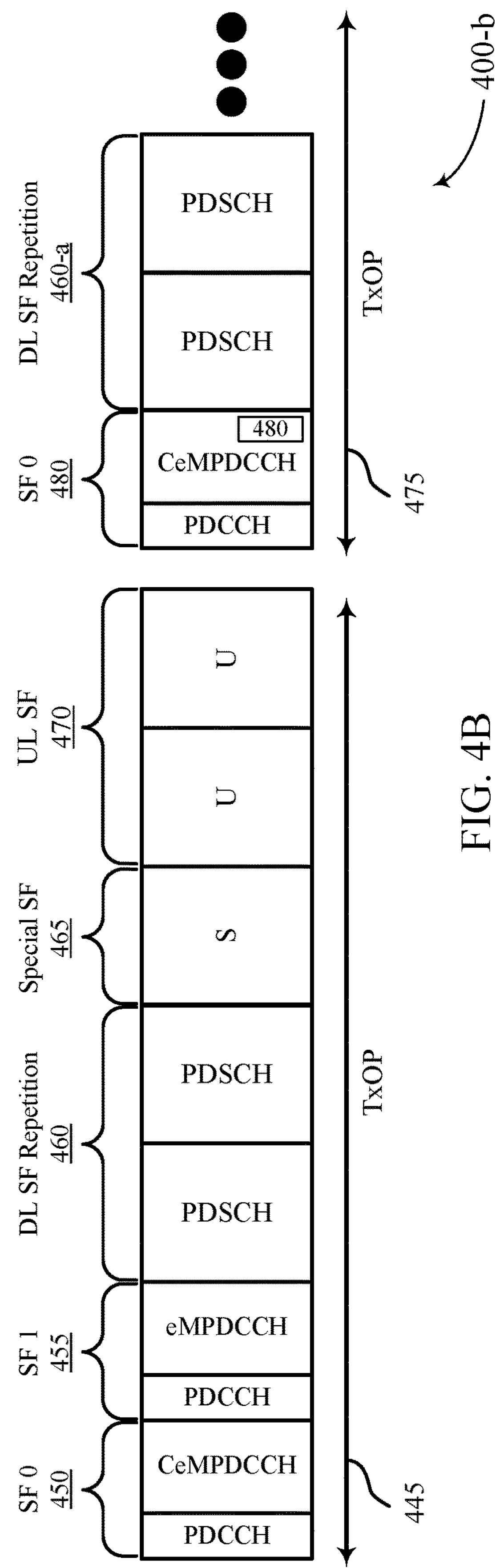

FIGS. 4A and 4B illustrate an example of a data frame structure that supports PDCCH and HARQ feedback for MuLTEfire coverage enhancement in accordance with aspects of the present disclosure. Data frame structure 400-*a* of FIG. 4A may be a data frame for transmission or reception during a transmission opportunity 405. The data frame structure 400-*a* may also be associated with a control signal. In some examples, the data frame structure 400-*a* may include a number of downlink subframe bursts and uplink subframe bursts. The data frame structure 400-*a* may be an intra-transmission opportunity repetition. In some cases, the data frame structure 400-*a* may include a subframe 0 410, a downlink subframe repetition 415, a special subframe 420, and uplink subframes 425.

The subframe 0 410 may include a PDCCH, a CeMPDCCH, and eMPDCCH. The PDCCH may support efficient data transmission. In some cases, the PDCCH may transport a DCI message. The DCI message may include resource assignments and other control information for UEs. For example, the DCI message may include a bitmap indicating resource block groups that are allocated to a UE. A resource block group may include a set of physical resource blocks. The physical resource blocks may indicate to a UE a quantity of subcarriers for a predetermined amount of time for transmission or reception. Alternatively, the CeMPD- CCH may indicate a structure of the data frame. The eMPDCCH may also indicate uplink grants and downlink grants during the transmission opportunity 405 of the data frame structure 400-*a*. As a result, a UE may be aware of a number of downlink subframe and uplink subframes in the data frame of the data frame structure 400-*a*. Additionally, the indication in the eMPDCCH may identify a starting location of a particular subframe in the data frame. For example, a UE may identify a starting location of uplink subframes 425 based on the indication provided in the eMPDCCH.

The downlink subframe repetition 415 may include a number of shared data signal repetitions. For example, the downlink subframe repetition 415 of the data frame structure 400-*a* may include four subframes including PDSCH. The special subframe 420 may include three fields. A first field may be a downlink pilot time slot, a second field may be a guard period, and a third field may be an uplink pilot time slot. In some cases, one or more fields of the special subframe 420 may be configurable in length. The special subframe 420 may have length size threshold. For example, the special subframe 420 may have a length size threshold of 1 ms.

Additionally, the uplink subframes 425 of the data frame associated with transmission opportunity 405 may include one or more uplink subframes for uplink transmissions. In some cases, an ACK signal may be transmitted during at least one uplink subframe of the uplink subframes 425. In some cases, the ACK signal may be transmitted during at least one uplink subframe of the uplink subframes 425 based on an indication carried on CeMPDCCH during the subframe 0 410. The uplink subframes 425 may also be associated with a transmission of a quantity of repetitive transmissions of PUSCH during uplink subframes 425 of the data frame based on information carried (e.g., control information) on eMPDCCH.

Data frame structure 400-*b* of FIG. 4B may be a data frame for transmission or reception during two transmission opportunities (i.e., transmission opportunity 445 and transmission opportunity 475). The data frame structure 400-*b* may also be associated with a control signal. In some examples, the data frame structure 400-*b* may include a quantity of downlink subframe bursts and uplink subframe bursts. The data frame structure 400-*b* may be associated with an inter-transmission opportunity repetition schedule.

The data frame structure 400-*b* may include a subframe 0 450, a subframe 1 455, a downlink subframe repetition portion 460, a special subframe 465, and uplink subframes 470. In some cases, the subframe 0 450 may be a common portion of a data frame. The subframe 0 450 may be a downlink subframe that may be a first occurring downlink subframe in a data frame for transmission opportunity 445. The subframe 0 450 may include a PDCCH and a CeMPDCCH. The PDCCH may support efficient data transmission.

In some cases, the PDCCH may transport a DCI message. The DCI message may include resource assignments and other control information. For example, the DCI message may include a bitmap indicating resource block groups that are allocated to a UE. A resource block group may include a set of physical resource blocks. The physical resource blocks may indicate to a UE a quantity of subcarriers for a predetermined amount of time for transmission or reception. Alternatively, the CeMPDCCH may indicate a structure of the data frame. The structure of the data frame may indicate a quantity of downlink or uplinks subframes, special frames, etc.

The subframe 1 455 may be a device specific portion subframe. The subframe 1 455 may be decoded based on UE capabilities (e.g., whether a UE is of a UE specific type). In some cases, the subframe 1 455 may include a PDCCH and an eMPDCCH. In some examples, the subframe 1 455 may be a subsequent downlink subframe that may be a second occurring downlink subframe in a data frame for transmission opportunity 445. In some examples, the subframe 1 455 may be any subsequent downlink subframe in a data frame for transmission opportunity 445. The PDCCH of subframe 1 455 may also support efficient data transmission. The eMPDCCH of subframe 1 455 may include information indicating uplink grants and downlink grants.

The downlink subframe repetition portion 460 may transport a shared data signal during a plurality of downlink subframes during the transmission opportunity 445. The downlink subframe repetition portion 460 may include a quantity of repetitive transmissions of a shared data signal that occurs during downlink subframes. For example, the downlink subframe repetition portion 460 may include two subframes transporting a PDSCH. In some cases, the data frame structure 400-*b* may include information indicating that the shared data signal is to be continued to be received during a subsequent transmission opportunity (i.e., transmission opportunity 475). In some examples, the information may be encoded in the subframe 0 450 or the subframe 1 455.

The special subframe 465 may include three fields. A first field may be a downlink pilot time slot, a second field may be a guard period, and a third field may be an uplink pilot time slot. In some cases, one or more fields of the special subframe 465 may be configurable in length. The special subframe 465 may have length size threshold. For example, the special subframe 465 may have length size threshold of 1 ms.

Additionally, the uplink subframes 470 of the data frame of transmission opportunity 445 may include one or more uplink subframes for uplink transmissions. In some cases, an ACK/NAK signal may be transmitted during at least one uplink subframe of the uplink subframes 470. In some cases, the ACK/NAK signal may be transmitted during at least one uplink subframe of the uplink subframes 470 based on an indication carried on CeMPDCCH in the subframe 0 450. The uplink subframes 470 may also be associated with a transmission of a quantity of repetitive transmissions of PUSCH during uplink subframes of the data frame based eMPDCCH of the control signal.

The data frame structure 400-*b* may be associated with an inter transmission opportunity repetition schedule. As a result, a second data frame may be transmitted by a base station and received by a UE. The second data frame may be associated with a transmission opportunity 475. The second data frame may include a subframe 0 480 and a downlink subframe repetition portion 460-*a*. In some examples, transmission opportunity 445 may have a different duration than transmission opportunity 445. Alternatively, transmission opportunity 445 and transmission opportunity 475 may have a same duration.

The subframe 0 480 may include a PDCCH and CeMPDCCH. Similar to the subframe 0 450, the PDCCH may transport a DCI message that includes resource assignments and other control information. CeMPDCCH of the subframe 0 480 may indicate uplink grants and downlink grants. Additionally or alternatively, the subframe 0 480 may include a trigger bit 480 in CeMPDCCH. The trigger bit 480 may indicate that a continuing transmission of a shared data signal is to occur. For example, the continuing transmission of a shared data signal may include the PDSCH transmission associated with the downlink subframe repetition portion 460. As a result, downlink subframe repetition portion 460-*a* may include the continuing transmission of the shared data signal (i.e., PDSCH).

Figure 5:
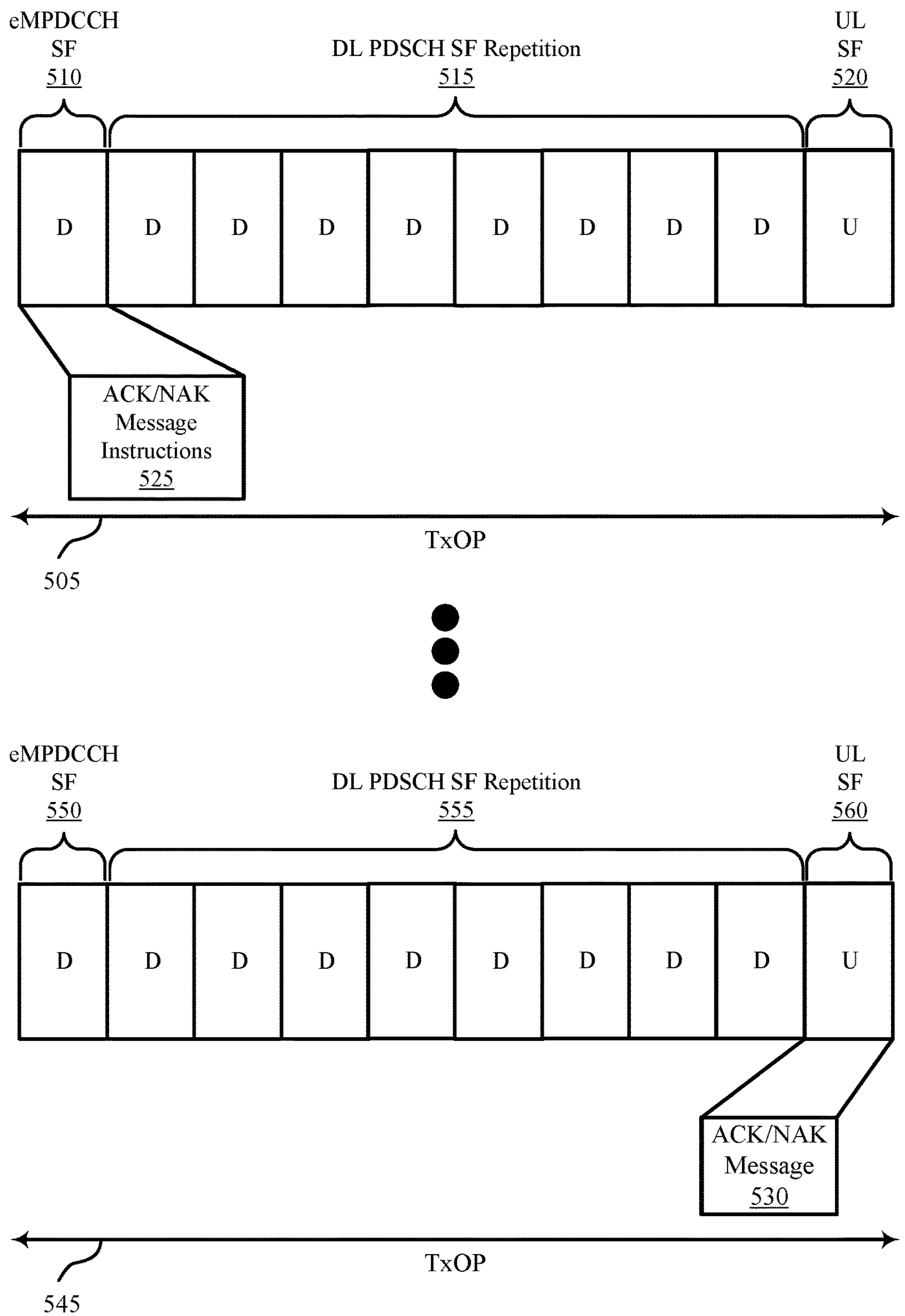
FIG. 5 illustrates an example of a data frame structure that supports PDCCH and HARQ feedback for MuLTEfire coverage enhancement in accordance with aspects of the present disclosure.

FIG. 5 illustrates an example of a data frame structure 500 that supports PDCCH and HARQ feedback for MuLTEfire coverage enhancement in accordance with aspects of the present disclosure. In some examples, the data frame structure 500 may be associated with HARQ scheduling for downlink heavy traffic. The data frame structure 500 may be associated with a data frame transmission during a transmission opportunity 505. The data frame may include an eMPDCCH subframe 510, a downlink PDSCH subframe repetition 515 and an uplink subframe 520. The eMPDCCH subframe 510 may indicate uplink grants and downlink grants during the transmission opportunity 505 of the data frame. In some examples, the eMPDCCH subframe 510 may indicate an uplink subframe of a subsequent data frame for which a UE may transmit an ACK/NAK message instructions 530, based on ACK/NAK message instructions 525. The ACK/NAK message instructions 530 may indicate to UEs a location (e.g., what subframe in a data frame) to transmit an ACK/NAK message in an uplink subframe.

The downlink PDSCH subframe repetition 515 may include eight downlink subframes. In some examples, a UE may have a downlink peak rate of 279.3 kbps. To satisfy the target SNR threshold the data frame may include the eight downlink subframes. Each subframe of the downlink PDSCH subframe repetition 515 may be associated with a PDSCH. In some cases, the number of downlink subframes in the downlink PDSCH subframe repetition 515 may be configurable based on the eMPDCCH subframe 510.

At a subsequent data frame of a transmission opportunity 545, the ACK/NAK message instructions 530 may be transmitted during uplink subframe 560. In some cases, the ACK/NAK message instructions 525 may be transmitted in a subsequent data frame due to processing delays (e.g., 12 ms) associated with a UE. Additionally, the subsequent data frame may also include the eMPDCCH subframe 550, the downlink PDSCH subframe repetition 555, or the uplink subframe 560, or any combination thereof.

Figure 6:
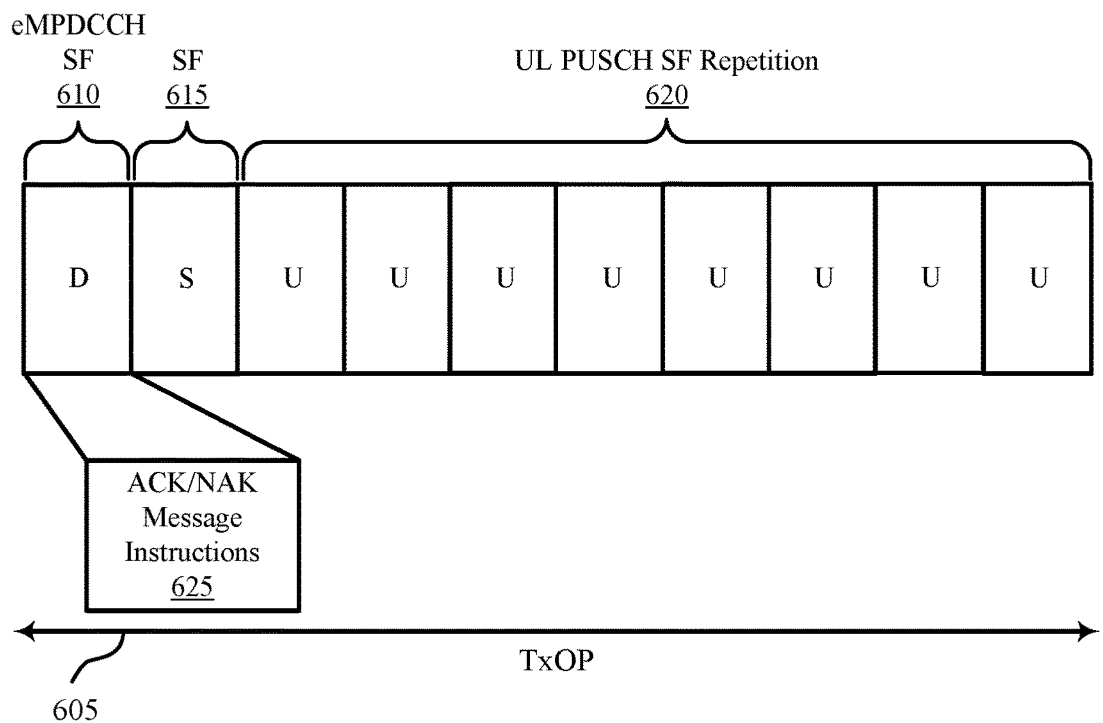
FIG. 6 illustrates an example of a data frame structure that supports PDCCH and HARQ request feedback for MuLTEfire coverage enhancement in accordance with aspects of the present disclosure.
Figure 6:
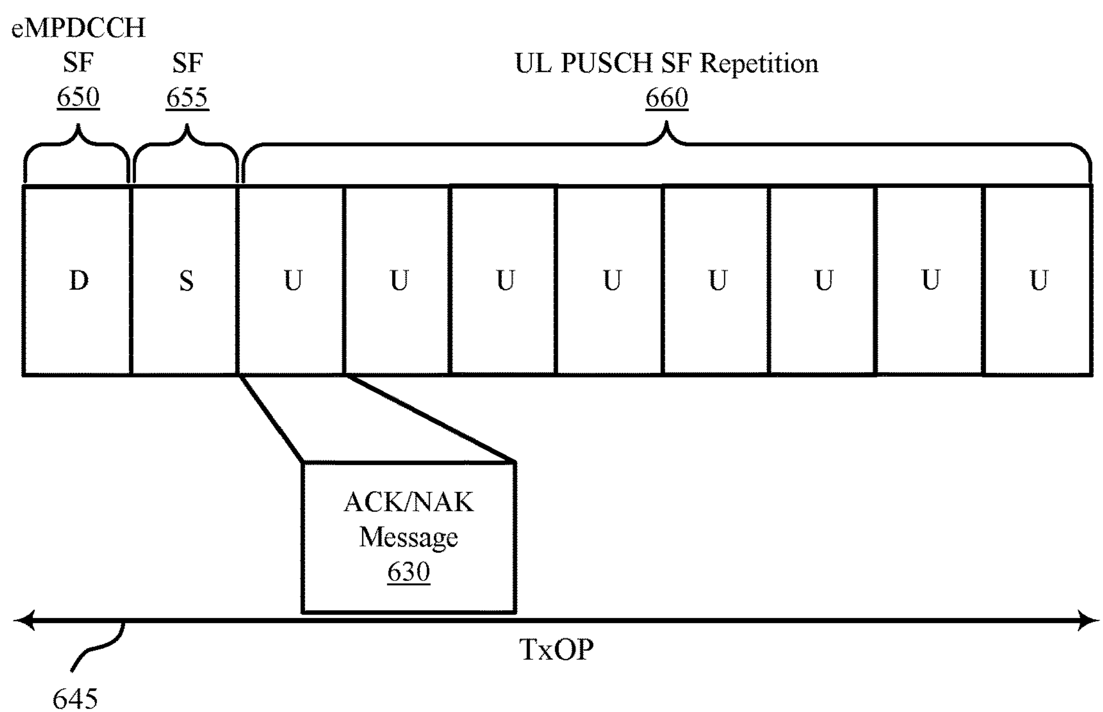

FIG. 6 illustrates an example of a data frame structure 600 that supports PDCCH and HARQ feedback for MuLTEfire coverage enhancement in accordance with aspects of the present disclosure. In some examples, the data frame structure 600 may be associated with HARQ scheduling for uplink heavy traffic. The data frame structure 600 may be associated with a data frame transmission during a transmission opportunity 605. The data frame may include an eMPDCCH subframe 610, a subframe 615, and an uplink PUSCH subframe repetition 620. The eMPDCCH subframe 610 may indicate uplink grants and downlink grants during the transmission opportunity 605 of the data frame. In some examples, a downlink subframe associated with the eMPDCCH subframe 610 may indicate a location of an uplink subframe in a data frame to transmit an ACK/NAK message instructions for downlink traffic. For uplink traffic, the ACK/NAK may be sent via an asynchronous HARQ. In some cases, the data frame structure 600 may include signaling via a downlink assignment index (DAI) bit in an upcoming receiving DAI bit in an eMPDCCH subframe.

In some examples, a downlink subframe associated with the eMPDCCH subframe 610 may indicate an uplink subframe of the data frame for which a UE may transmit an ACK/NAK message instructions 625. For example, the indication may be encoded in penultimate subframe of an uplink PUSCH subframe repetition in a subsequent data frame. The subframe 615 may be a special subframe. The special subframe may include two half-frames of equal length, with each half-frame including a predetermined number of slots (e.g., 10 slots or 8 slots in addition to three special fields). The three special fields may include downlink pilot time slot, a guard period, and an uplink pilot time slot. Each slot may be 0.5 ms in length. In some examples, the length of the three fields in the special frame may be based on uplink/downlink configuration selected by a base station. However, the a total length of the three fields is 1 ms.

The uplink PUSCH subframe repetition 620 may include eight uplink subframes. In some examples, a UE may have a uplink peak rate per interlace of 25.6 kbps/interlace. To satisfy the target SNR threshold the data frame may include the eight uplink subframes. Each subframe of the uplink PUSCH subframe repetition 620 may be associated with a PUSCH. In some cases, the number of uplink subframes in the uplink PUSCH subframe repetition 620 may be configurable based on the eMPDCCH subframe 610.

At a subsequent data frame of a transmission opportunity 645, the ACK/NAK message 630 may be transmitted in the eMPDCCH subframe 650 of transmission opportunity 645. In some cases, the ACK/NAK message 630 may be transmitted in a subsequent data frame due to processing delays associated with a UE, for example in a subframe of UL PUSCH SF repetition 660. Additionally, the subsequent data frame may similarly include eMPDCCH subframe 650, subframe 655, and UL PUSCH SF repetition 660.

Figure 7:
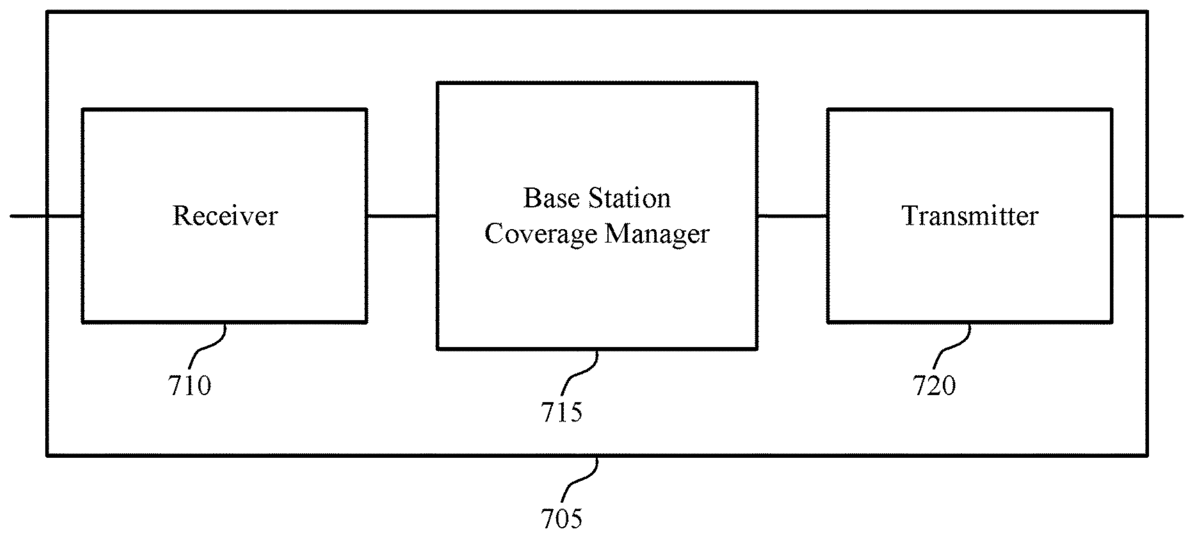
FIGS. 7 and 8 illustrate block diagrams of a wireless device that supports PDCCH and HARQ feedback for MuLTEfire coverage enhancement in accordance with aspects of the present disclosure.

FIG. 7 illustrates a block diagram 700 of a wireless device 705 that supports PDCCH and HARQ feedback for MuLTEfire coverage enhancement in accordance with aspects of the present disclosure. Wireless device 705 may be an example of aspects of a base station 105 as described with reference to FIG. 1. Wireless device 705 may include receiver 710, base station coverage manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related IoT or UE devices, etc.). Information may be passed on to other components of the device. The receiver 710 may be an example of aspects of the transceiver 1035 described with reference to FIG. 10.

Base station coverage manager 715 may encode a control signal that includes a common portion for receiving devices, the common portion indicating a structure of a data frame, the control signal further including a device specific portion for a specific receiving device, the device specific portion indicating uplink grants and downlink grants during the data frame for the specific receiving device; assign a downlink subframe that is a first occurring downlink subframe in the data frame; and transmit the encoded control signal during a first transmission opportunity, wherein at least the common portion of the control signal is transmitted during the selected downlink subframe.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas. Transmitter 720 may transmit encoded control signals during subframes within a data frame.

Figure 8:
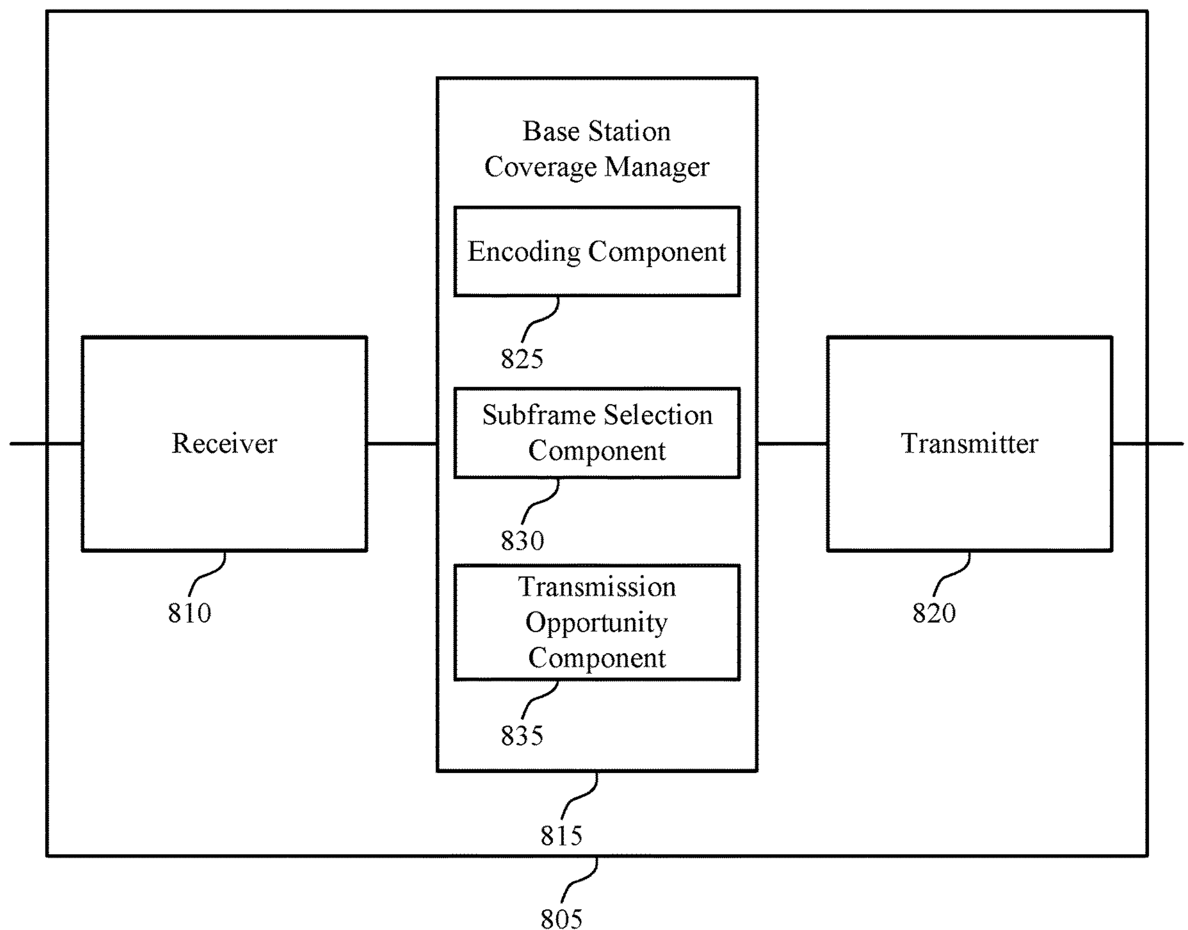

FIG. 8 illustrates a block diagram 800 of a wireless device 805 that supports PDCCH and HARQ feedback for MuLTEfire coverage enhancement in accordance with aspects of the present disclosure. Wireless device 805 may be an example of aspects of a wireless device 805 or a base station 105 as described with reference to FIGS. 1 and 7. Wireless device 805 may include receiver 810, base station coverage manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related IoT or UE devices, etc.). Information may be passed on to other components of the device. The receiver 810 may be an example of aspects of the transceiver 1035 described with reference to FIG. 10.

Base station coverage manager 815 may be an example of aspects of the base station coverage manager 715 described with reference to FIG. 7. Base station coverage manager 815 encoding component 825, subframe selection component 830, and transmission opportunity component 835.

Encoding component 825 may encode a control signal that includes a common portion for receiving devices, the common portion indicating a structure of a data frame, the control signal further including a device specific portion for a specific receiving device, the device specific portion indicating uplink grants and downlink grants during the data frame for the specific receiving device. In some examples, the device specific portion of the control signal indicates a quantity of repetitive transmissions of a shared data signal that occurs during downlink subframes or uplink subframes of the data frame. In some examples, the common portion of the control signal identifies an uplink subframe of the data frame during which a receiving device is to transmit an acknowledgement (ACK) signal. In some examples, the control signal is an enhanced machine-type physical downlink control channel (eMPDCCH). Additionally or alternatively, the common portion and the device specific portion include at least one of a physical downlink control channel (PDCCH), an enhanced machine-type PDCCH (eMPDCCH), and a common eMPDCCH (CeMPDCCH), or a combination thereof.

Subframe selection component 830 may assign a downlink subframe that is a first occurring downlink subframe in the data frame. In some examples, subframe selection component 830 may determine a quantity of downlink subframes or uplink subframes of a data frame based on a duration of the first transmission opportunity. Alternatively, subframe selection component 830 may determine a quantity of downlink subframes or uplink subframes of a data frame based on a subframe configuration parameter.

Transmission opportunity component 835 may transmit an encoded control signal during a first transmission opportunity, where at least the common portion of the control signal is transmitted during the selected downlink subframe. In some examples, transmission opportunity component 835 may transmit a shared data signal during a plurality of downlink subframes during a first transmission opportunity. Transmission opportunity component 835 may additionally or alternatively transmit a trigger bit with the common portion of a control signal during a downlink subframe that is a first occurring downlink subframe in the data frame during the second transmission opportunity. In some examples, transmission opportunity component 835 may receive a shared data signal during a plurality of uplink subframes during a first transmission opportunity. The shared data signal includes a PDSCH or a PUSCH.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
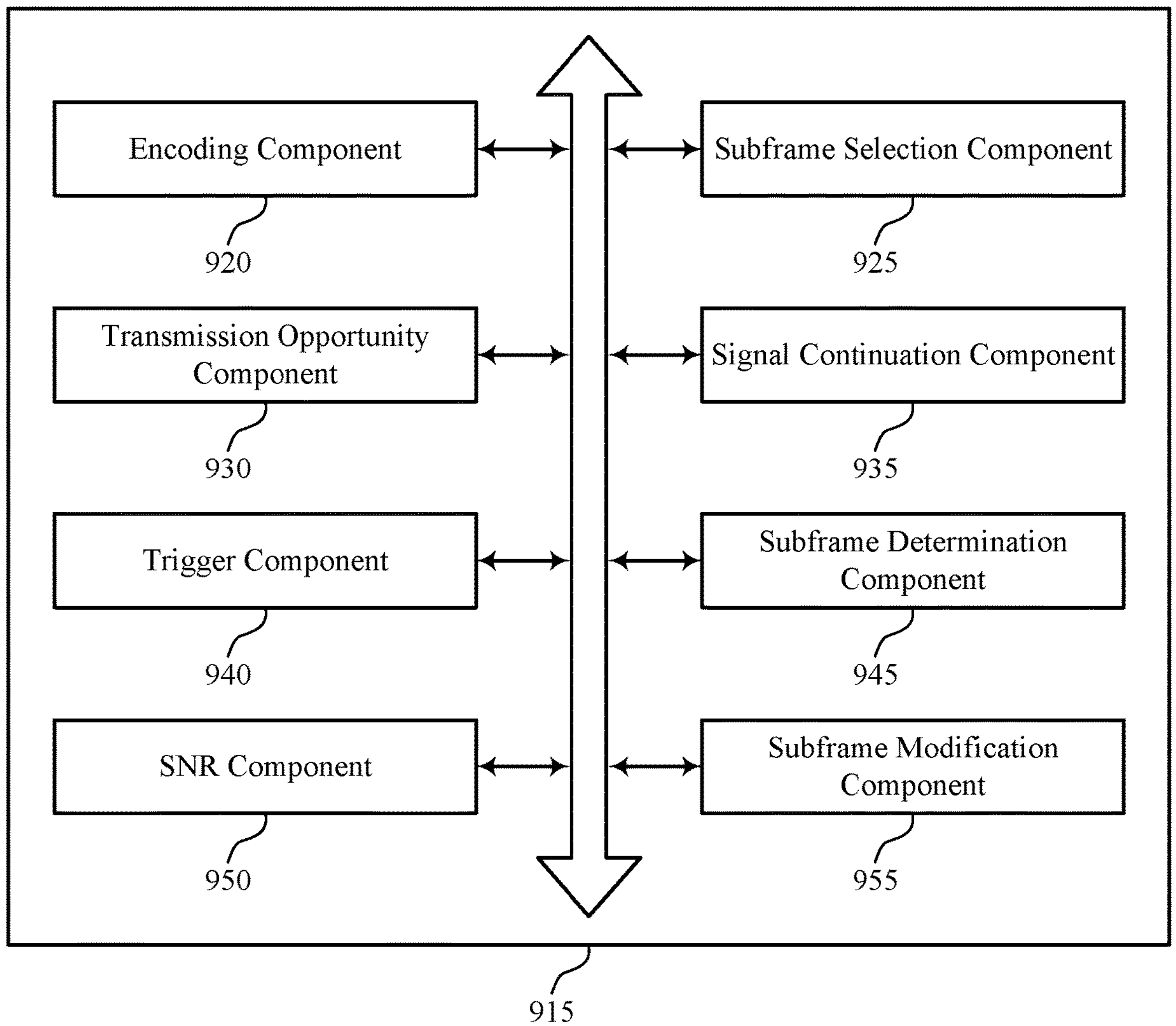
FIG. 9 illustrates a block diagram of a base station coverage manager that supports PDCCH and HARQ feedback for MuLTEfire coverage enhancement in accordance with aspects of the present disclosure.

FIG. 9 illustrates a block diagram 900 of a base station coverage manager 915 that supports PDCCH and HARQ feedback for MuLTEfire coverage enhancement in accordance with aspects of the present disclosure. The base station coverage manager 915 may be an example of aspects of a base station coverage manager 715 or base station coverage manager 815 described with reference to FIGS. 7 and 8. The base station coverage manager 915 may include encoding component 920, subframe selection component 925, transmission opportunity component 930, signal continuation component 935, trigger component 940, subframe determination component 945, SNR component 950, and subframe modification component 955. Each of these modules may communicate, directly or indirectly, with one another (e.g., via one or more buses).

Encoding component 920 may encode a control signal that includes a common portion for receiving devices, the common portion indicating a structure of a data frame, the control signal further including a device specific portion for a specific receiving device, the device specific portion indicating uplink grants and downlink grants during the data frame for the specific receiving device. In some examples, the device specific portion of the control signal indicates a quantity of repetitive transmissions of a shared data signal that occurs during downlink subframes or uplink subframes of the data frame. In some examples, the common portion of the control signal identifies an uplink subframe of the data frame during which a receiving device is to transmit an acknowledgement (ACK) signal. In some examples, the control signal is an enhanced machine-type physical downlink control channel (eMPDCCH). Additionally or alternatively, the common portion and the device specific portion include at least one of a physical downlink control channel (PDCCH), an enhanced machine-type PDCCH (eMPDCCH), and a common eMPDCCH (CeMPDCCH), or a combination thereof.

Subframe selection component 925 assign a downlink subframe that is a first occurring downlink subframe in the data frame. In some examples, subframe selection component 830 may determine a quantity of downlink subframes or uplink subframes of a data frame based on a duration of the first transmission opportunity. Alternatively, subframe selection component 925 may determine a quantity of downlink subframes or uplink subframes of a data frame based on a subframe configuration parameter.

Transmission opportunity component 930 may transmit an encoded control signal during a first transmission opportunity, where at least the common portion of the control signal is transmitted during the selected downlink subframe. In some examples, transmission opportunity component 835 may transmit a shared data signal during a plurality of downlink subframes during a first transmission opportunity. Transmission opportunity component 835 may additionally or alternatively transmit a trigger bit with the common portion of a control signal during a downlink subframe that is a first occurring downlink subframe in the data frame during the second transmission opportunity. In some examples, transmission opportunity component 835 may receive a shared data signal during a plurality of uplink subframes during a first transmission opportunity. The shared data signal includes a PDSCH or a PUSCH.

Signal continuation component 935 may determine that a shared data signal is to be continued to be transmitted during a second transmission opportunity that is subsequent to a first transmission opportunity. In some examples, signal continuation component 935 may determine that a shared data signal is to be continued to be received during a second transmission opportunity that is subsequent to a first transmission opportunity. Trigger component 940 may associate a trigger bit with a common portion of a control signal. In some cases, the trigger bit may indicate a continuing transmission of the shared data signal. In some examples, trigger component 940 may associate a trigger bit with a common portion of a control signal. In some cases, the trigger bit may indicate a continuing reception of the shared data signal.

Subframe determination component 945 may determine a quantity of downlink subframes or uplink subframes of a data frame based on a duration of a first transmission opportunity. In some examples, determining the quantity of downlink subframes or uplink subframes of the data frame may be based on a subframe configuration parameter. SNR component 950 may determine an SNR threshold, and determine a quantity of downlink or uplink subframes based on the SNR threshold.

Subframe modification component 955 may assign of configure a set size of a data frame to a predetermined number of physical resource block pairs based on an aggregation level. In some cases, the predetermined number of physical resource block pairs is 32. In some cases, the aggregation level is 64 or higher.

Figure 10:
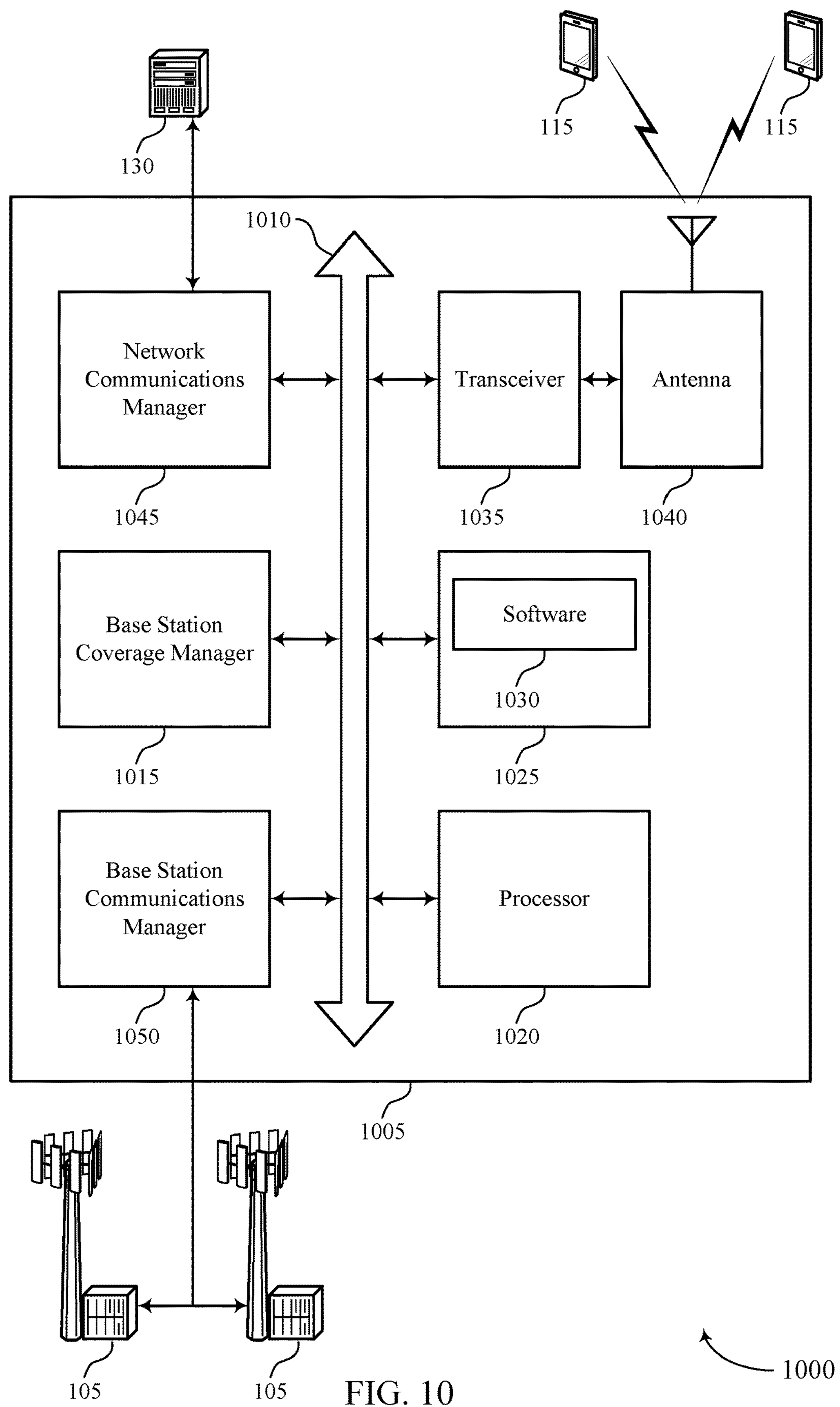
FIG. 10 illustrates a block diagram of a system including a wireless device that supports PDCCH and HARQ feedback for MuLTEfire coverage enhancement in accordance with aspects of the present disclosure.

FIG. 10 illustrates a block diagram of a system 1000 including a wireless device 1005 that supports PDCCH and HARQ feedback for MuLTEfire coverage enhancement in accordance with aspects of the present disclosure. Wireless device 1005 may be an example of or include the components of wireless device 705, wireless device 805, or a base station 105 as described above, e.g., with reference to FIGS. 1, 7, and 8. Wireless device 1005 may include components for bi-directional voice and data communications including components for transmitting and receiving communications, including base station coverage manager 1015, processor 1020, memory 1025, software 1030, transceiver 1035, antenna 1040, network communications manager 1045, and base station communications manager 1050. These components may be in electronic communication via one or more busses (e.g., bus 1010). Wireless device 1005 may communicate wirelessly with one or more UEs 115.

Base station coverage manager 1015 may be an example of base station coverage manager 715, base station coverage manager 815, or a base station coverage manager 915 as described above, e.g., with reference to FIGS. 7, 8, and 9. Base station coverage manager 1015 may encode a control signal that includes a common portion for receiving devices, the common portion indicating a structure of a data frame, the control signal further comprising a device specific portion for a specific receiving device, the device specific portion indicating uplink grants and downlink grants during the data frame for the specific receiving device; assign a downlink subframe that is a first occurring downlink subframe in the data frame; and transmit the encoded control signal during a first transmission opportunity, wherein at least the common portion of the control signal is transmitted during the selected downlink subframe.

Processor 1020 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting PDCCH and HARQ feedback for MuLTEfire coverage enhancement).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support PDCCH and HARQ feedback for MuLTEfire coverage enhancement. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices or IoT devices, such as one or more UEs 115.

Base station communications manager 1050 may manage communications with other base station 105, and may include a controller or scheduler for controlling communications with UEs 115 in cooperation with other base stations 105. For example, the base station communications manager 1050 may coordinate scheduling for transmissions to UEs 115 for various interference mitigation techniques such as beamforming or joint transmission. In some examples, base station communications manager 1050 may provide an X2 interface within a Long Term Evolution (LTE)/LTE-A wireless communication network technology to provide communication between base stations 105.

Figure 11:
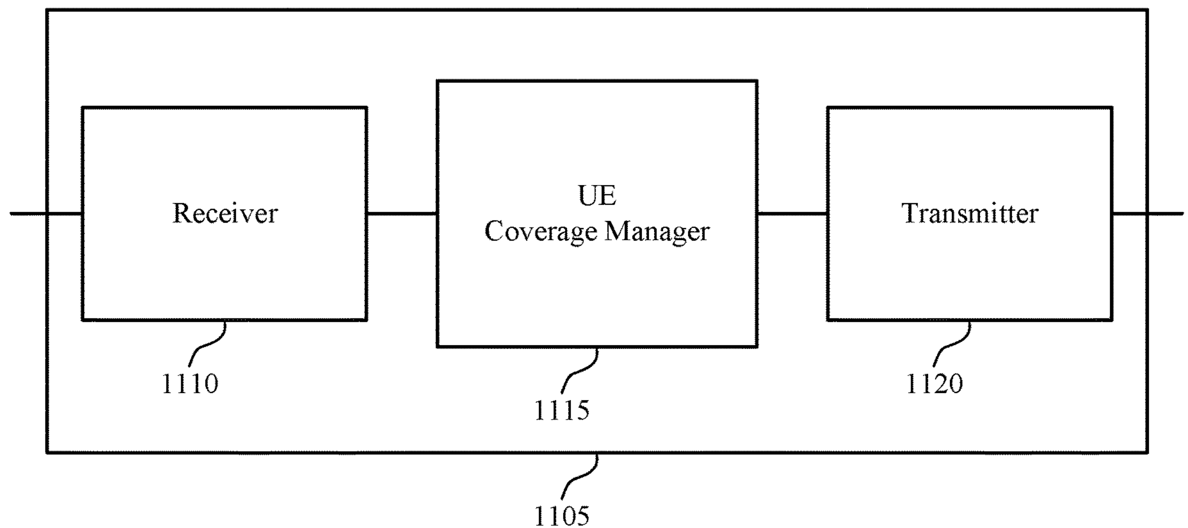
FIGS. 11 through 12 illustrate block diagrams of a system including a wireless device that supports PDCCH and HARQ feedback for MuLTEfire coverage enhancement in accordance with aspects of the present disclosure.

FIG. 11 illustrates a block diagram 1100 of a wireless device 1105 that supports PDCCH and HARQ feedback for MuLTEfire coverage enhancement in accordance with aspects of the present disclosure. Wireless device 1105 may be an example of aspects of a UE 115 as described with reference to FIG. 1. Wireless device 1105 may include receiver 1110, UE coverage manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related IoT or UE devices, etc.). Information may be passed on to other components of the device. The receiver 1110 may be an example of aspects of the transceiver 1435 described with reference to FIG. 14.

UE coverage manager 1115 may receive an encoded control signal in a data frame that includes a common portion and a device specific portion during a first transmission opportunity; identify that the encoded control signal is received during a downlink subframe that is a first occurring downlink subframe in the data frame; and decode the encoded control signal in the first occurring downlink subframe in the data frame.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may include a single antenna, or it may include a set of antennas. Transmitter 1120 may transmit encoded control signals during subframes within a data frame.

Figure 12:
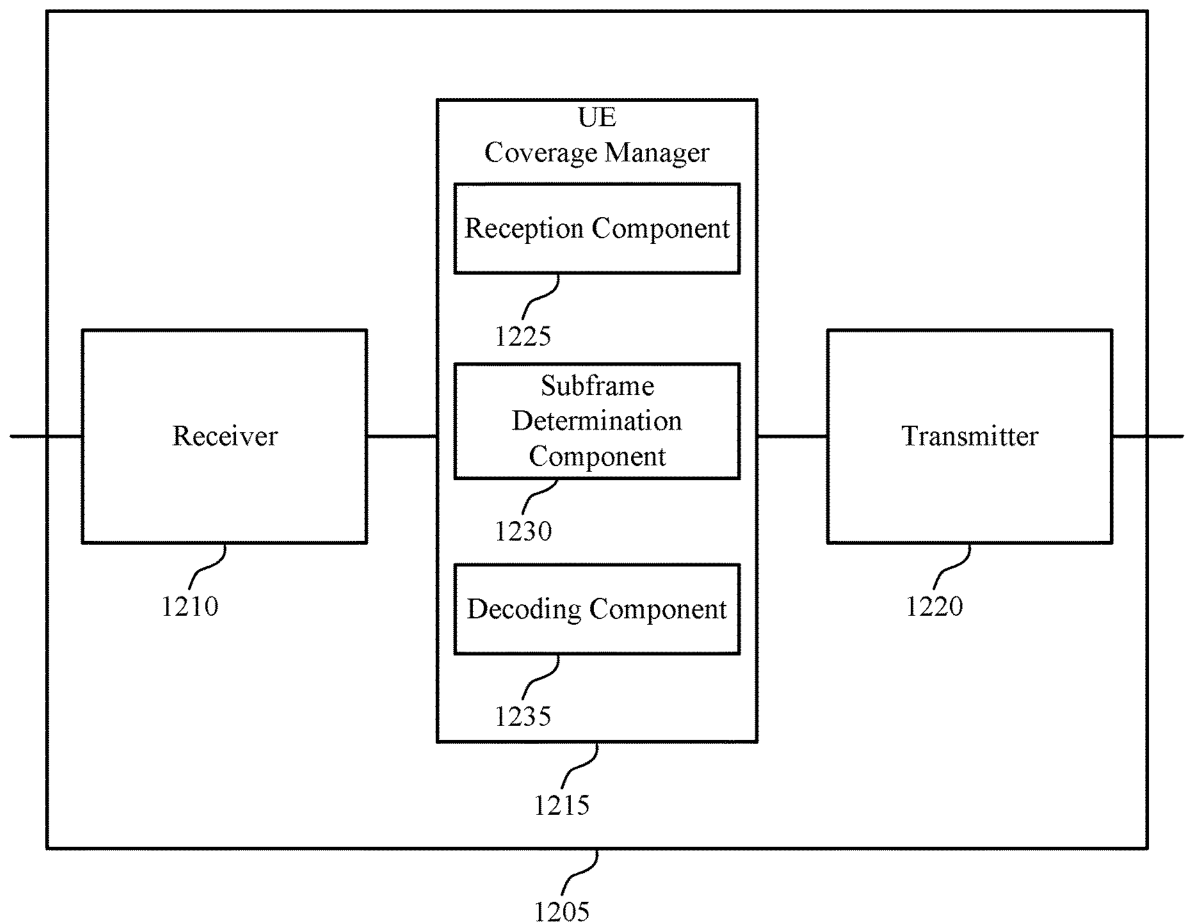

FIG. 12 illustrates a block diagram 1200 of a wireless device 1205 that supports PDCCH and HARQ feedback for MuLTEfire coverage enhancement in accordance with aspects of the present disclosure. Wireless device 1205 may be an example of aspects of a wireless device 1105 or a UE 115 as described with reference to FIGS. 1 and 11. Wireless device 1205 may include receiver 1210, UE coverage manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related IoT or UE devices, etc.). Information may be passed on to other components of the device. The receiver 1210 may be an example of aspects of the transceiver 1435 described with reference to FIG. 14.

UE coverage manager 1215 may be an example of aspects of UE coverage manager 1215 described with reference to FIG. 11. UE coverage manager 1215 may also include reception component 1225, subframe determination component 1230, and decoding component 1235. Reception component 1225 may receive an encoded control signal in a data frame that includes a common portion and a device specific portion during a first transmission opportunity.

Subframe determination component 1230 may identify that the encoded control signal is received during a downlink subframe that is a first occurring downlink subframe in the data frame. In some examples, the device specific portion of the control signal indicates a quantity of repetitive transmissions of a shared data signal that occurs during downlink subframes or uplink subframes of the data frame. In some cases, the shared data signal includes a PDSCH or a PUSCH. Subframe determination component 1230 may transmit a quantity of repetitive transmissions of PUSCH during uplink subframes of the data frame based on the device specific portion of the control signal. In some cases, subframe determination component 1230 may receive a quantity of repetitive transmissions of PDSCH during downlink subframes of the data frame based on the device specific portion of the control signal.

Decoding component 1235 may decode the encoded control signal in the first occurring downlink subframe in the data frame. In some examples, decoding component 1235 may decode the common portion that indicates the structure of the data frame, and decode the device specific portion that indicates uplink grants and downlink grants during the data frame.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may include a single antenna, or it may include a set of antennas. Transmitter 1220 may transmit encoded control signals during subframes within a data frame.

Figure 13:
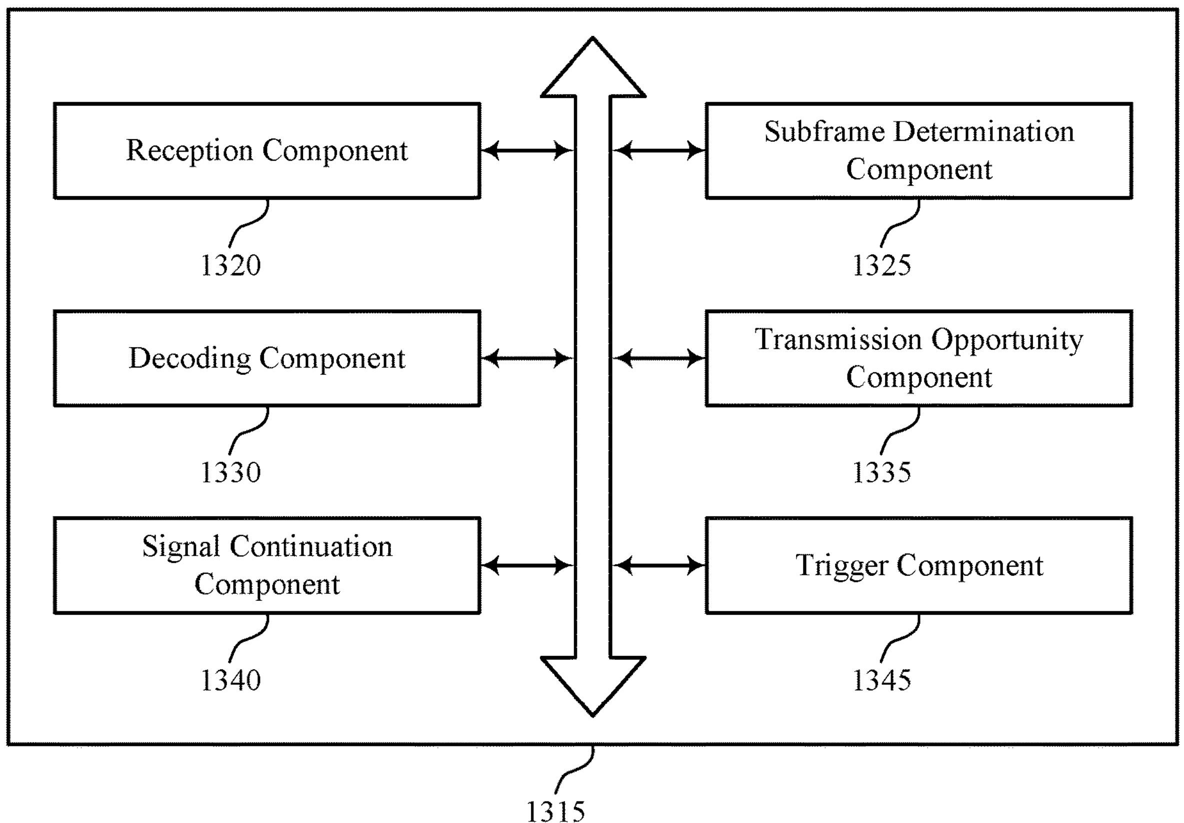
FIG. 13 illustrates a block diagram of a UE coverage manager that supports PDCCH and HARQ feedback for MuLTEfire coverage enhancement in accordance with aspects of the present disclosure.

FIG. 13 illustrates a block diagram 1300 of a UE coverage manager 1315 that supports PDCCH and HARQ feedback for MuLTEfire coverage enhancement in accordance with aspects of the present disclosure. UE coverage manager 1315 may be an example of aspects of a UE coverage manager 1315 described with reference to FIGS. 11 and 12. The UE coverage manager 1315 may include reception component 1320, subframe determination component 1325, decoding component 1330, transmission opportunity component 1335, signal continuation component 1340, and trigger component 1345.

Reception component 1320 may receive an encoded control signal in a data frame that includes a common portion and a device specific portion during a first transmission opportunity. Subframe determination component 1325 may identify that the encoded control signal is received during a downlink subframe that is a first occurring downlink subframe in the data frame. In some examples, the device specific portion of the control signal indicates a quantity of repetitive transmissions of a shared data signal that occurs during downlink subframes or uplink subframes of the data frame. In some cases, the shared data signal includes a PDSCH or a PUSCH. Subframe determination component 1325 may transmit a quantity of repetitive transmissions of PUSCH during uplink subframes of the data frame based on the device specific portion of the control signal. In some cases, subframe determination component 1325 may receive a quantity of repetitive transmissions of PDSCH during downlink subframes of the data frame based on the device specific portion of the control signal.

Decoding component 1330 may decode the encoded control signal in the first occurring downlink subframe in the data frame. In some examples, decoding component 1330 may decode the common portion that indicates the structure of the data frame, and decode the device specific portion that indicates uplink grants and downlink grants during the data frame.

Transmission opportunity component 1335 may receive a shared data signal during a plurality of downlink subframes during a first transmission opportunity. In some examples, transmission opportunity component 1335 may transmit an ACK signal during an uplink subframe of a data frame based on an indication in a common portion of a control signal. Signal continuation component 1340 may determine that the shared data signal is to be continued to be received during a second transmission opportunity that is subsequent to the first transmission opportunity.

Trigger component 1345 may decode a trigger bit from the common portion of the control signal during the second transmission opportunity, the trigger bit indicating a continuing transmission of the shared data signal. In some examples, trigger component 1345 may receive the decoded trigger bit with the common portion of the control signal during a downlink subframe that is a first occurring downlink subframe in the data frame during the second transmission opportunity.

Figure 14:
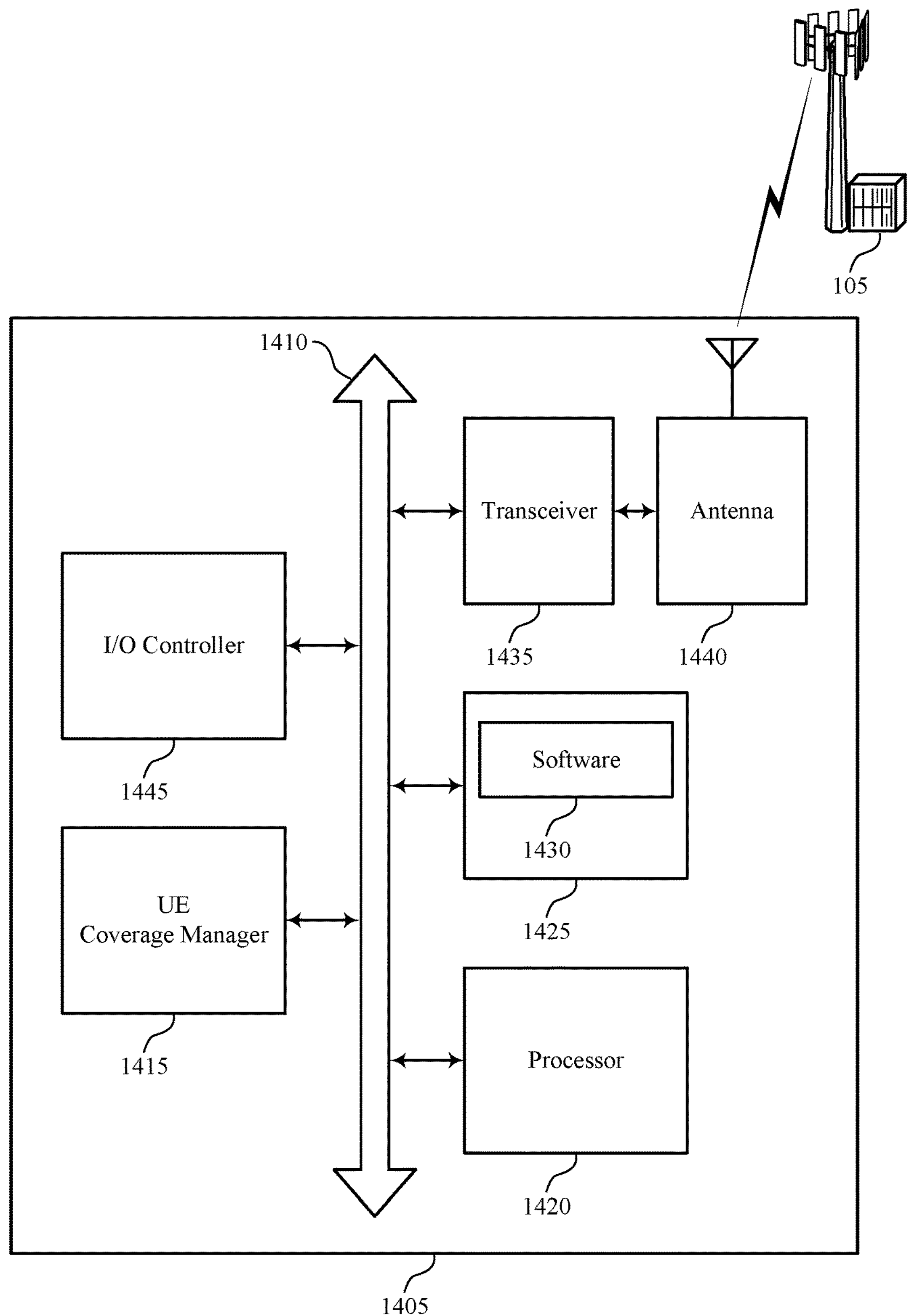
FIG. 14 illustrates a diagram of a system including a device that supports PDCCH and HARQ feedback for MuLTEfire coverage enhancement in accordance with aspects of the present disclosure.

FIG. 14 illustrates a block diagram of a system 1400 including a wireless device 1405 that supports PDCCH and HARQ feedback for MuLTEfire coverage enhancement in accordance with aspects of the present disclosure. Wireless device 1405 may be an example of or include the components of UE 115 as described above, e.g., with reference to FIG. 1. Wireless device 1405 may include components for bi-directional voice and data communications including components for transmitting and receiving communications, including UE coverage manager 1415, processor 1420, memory 1425, software 1430, transceiver 1435, antenna 1440, and I/O controller 1445. These components may be in electronic communication via one or more busses (e.g., bus 1410). Wireless device 1405 may communicate wirelessly with one or more base stations 105.

UE coverage manager 1415 may be an example of UE coverage manager 1115, UE coverage manager 1215, or UE coverage manager 1315 as described above, e.g., with reference to FIGS. 11, 12, and 13. UE coverage manager 1415 may receive an encoded control signal in a data frame that includes a common portion and a device specific portion during a first transmission opportunity; identify that the encoded control signal is received during a downlink subframe that is a first occurring downlink subframe in the data frame; and decode the encoded control signal in the first occurring downlink subframe in the data frame.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting PDCCH and HARQ feedback for MuLTEfire coverage enhancement).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support PDCCH and HARQ feedback for MuLTEfire coverage enhancement. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas. In some cases, the wireless device may include a single antenna 1440. However, in some cases the device may have more than one antenna 1440, which may be capable of concurrently transmitting or receiving multiple wireless transmissions.

I/O controller 1445 may manage input and output signals for wireless device 1405. I/O controller 1445 may also manage peripherals not integrated into wireless device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system.

Figure 15:
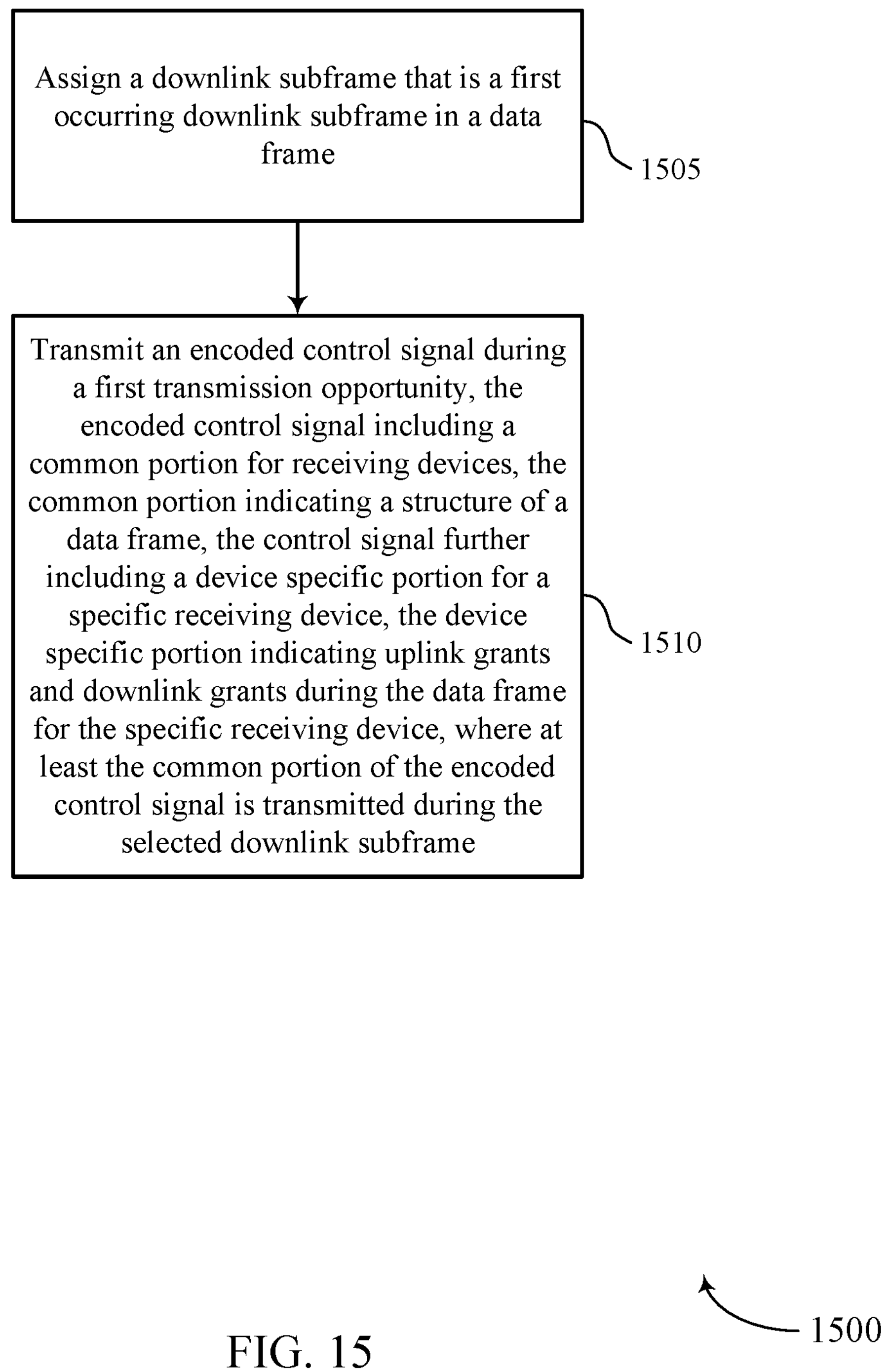
FIGS. 15 through 20 illustrate methods for PDCCH and HARQ feedback for MuLTEfire coverage enhancement in accordance with aspects of the present disclosure.

FIG. 15 illustrates a flowchart of a method 1500 for PDCCH and HARQ feedback for MuLTEfire coverage enhancement in accordance with aspects of the present disclosure. The operations of method 1500 may be implemented by a base station 105 or its components as described herein. For example, the operations of method 1500 may be performed by a base station coverage manager as described with reference to FIGS. 7 through 10. In some examples, a base station 105 may execute a set of codes to control the functional elements of the device to perform the functions described below. Additionally or alternatively, the base station 105 may perform aspects the functions described below using special-purpose hardware.

At block 1505 the base station 105 may assign a downlink subframe that is a first occurring downlink subframe in a data frame. The operations of block 1505 may be performed according to the methods described with reference to FIGS. 1 through 6. In certain examples, aspects of the operations of block 1505 may be performed by a subframe selection component as described with reference to FIGS. 8 and 9.

At block 1510 the base station 105 may transmit an encoded control signal during a first transmission opportunity, the encoded control signal comprising a common portion for receiving devices, the common portion indicating a structure of the data frame, the encoded control signal further comprising a device specific portion for a specific receiving device, the device specific portion indicating uplink grants and downlink grants during the data frame for the specific receiving device, where at least the common portion of the control signal is transmitted during the selected downlink subframe. The operations of block 1510 may be performed according to the methods described with reference to FIGS. 1 through 6. In certain examples, aspects of the operations of block 1510 may be performed by a transmission opportunity component as described with reference to FIGS. 8 and 9.

Figure 16:
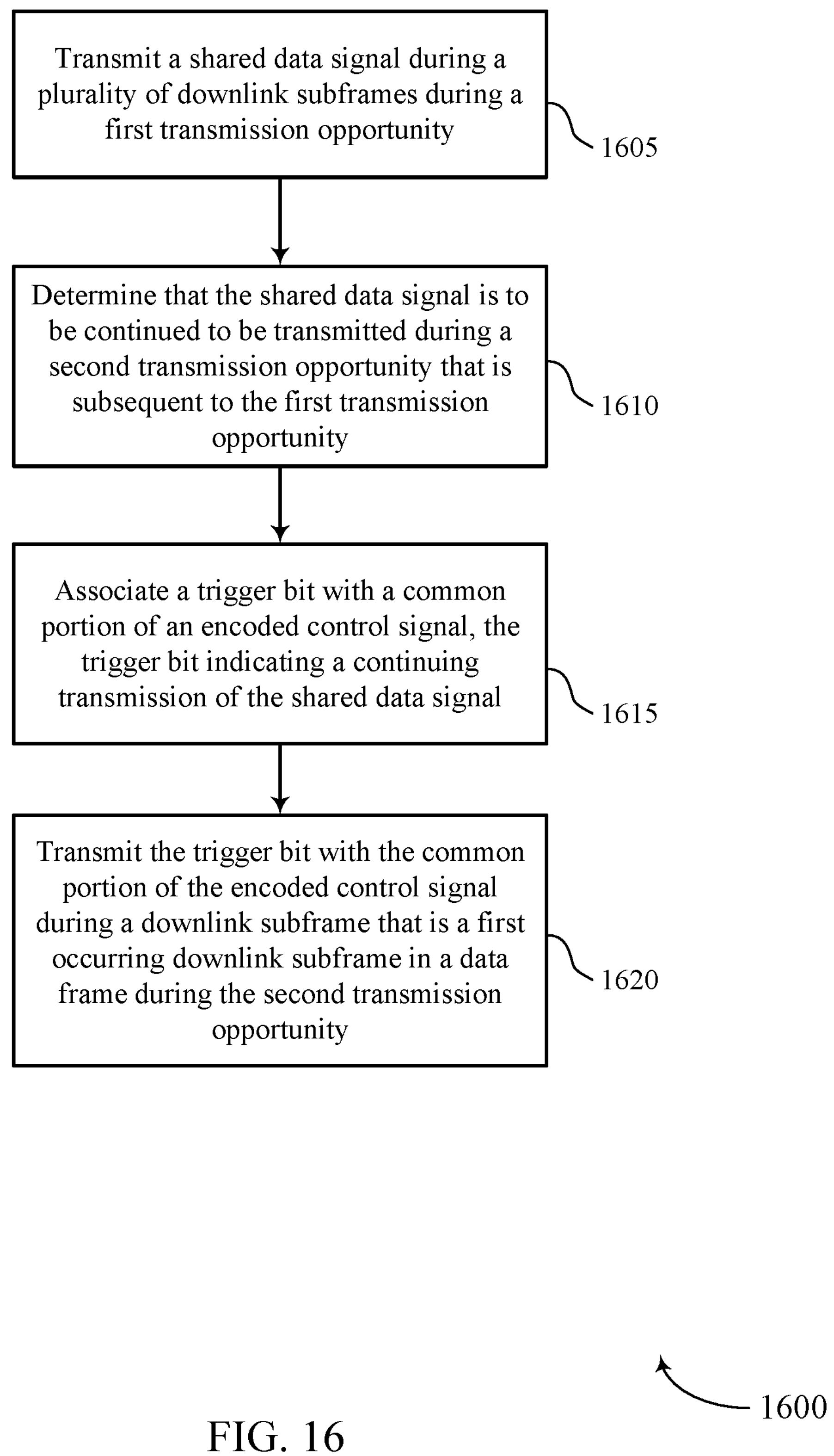

FIG. 16 illustrates a flowchart of a method 1600 for PDCCH and HARQ feedback for MuLTEfire coverage enhancement in accordance with aspects of the present disclosure. The operations of method 1600 may be implemented by a base station 105 or its components as described herein. For example, the operations of method 1600 may be performed by a base station coverage manager as described with reference to FIGS. 7 through 10. In some examples, a base station 105 may execute a set of codes to control the functional elements of the device to perform the functions described below. Additionally or alternatively, the base station 105 may perform aspects the functions described below using special-purpose hardware.

At block 1605 the base station 105 may transmit a shared data signal during a plurality of downlink subframes during the first transmission opportunity. The operations of block 1605 may be performed according to the methods described with reference to FIGS. 1 through 6. In certain examples, aspects of the operations of block 1605 may be performed by a transmission opportunity component as described with reference to FIGS. 8 and 9.

At block 1610 the base station 105 may determine that the shared data signal is to be continued to be transmitted during a second transmission opportunity that is subsequent to the first transmission opportunity. The operations of block 1610 may be performed according to the methods described with reference to FIGS. 1 through 6. In certain examples, aspects of the operations of block 1610 may be performed by a transmission opportunity component as described with reference to FIGS. 8 and 9.

At block 1615 the base station 105 may associate a trigger bit with the common portion of an encoded control signal, the trigger bit indicating a continuing transmission of the shared data signal. The operations of block 1615 may be performed according to the methods described with reference to FIGS. 1 through 6. In certain examples, aspects of the operations of block 1615 may be performed by a trigger component as described with reference to FIG. 9.

At block 1620 the base station 105 may transmit the trigger bit with the common portion of the encoded control signal during a downlink subframe that is a first occurring downlink subframe in a data frame during the second transmission opportunity. The operations of block 1620 may be performed according to the methods described with reference to FIGS. 1 through 6. In certain examples, aspects of the operations of block 1620 may be performed by a transmission opportunity component as described with reference to FIGS. 8 and 9.

Figure 17:
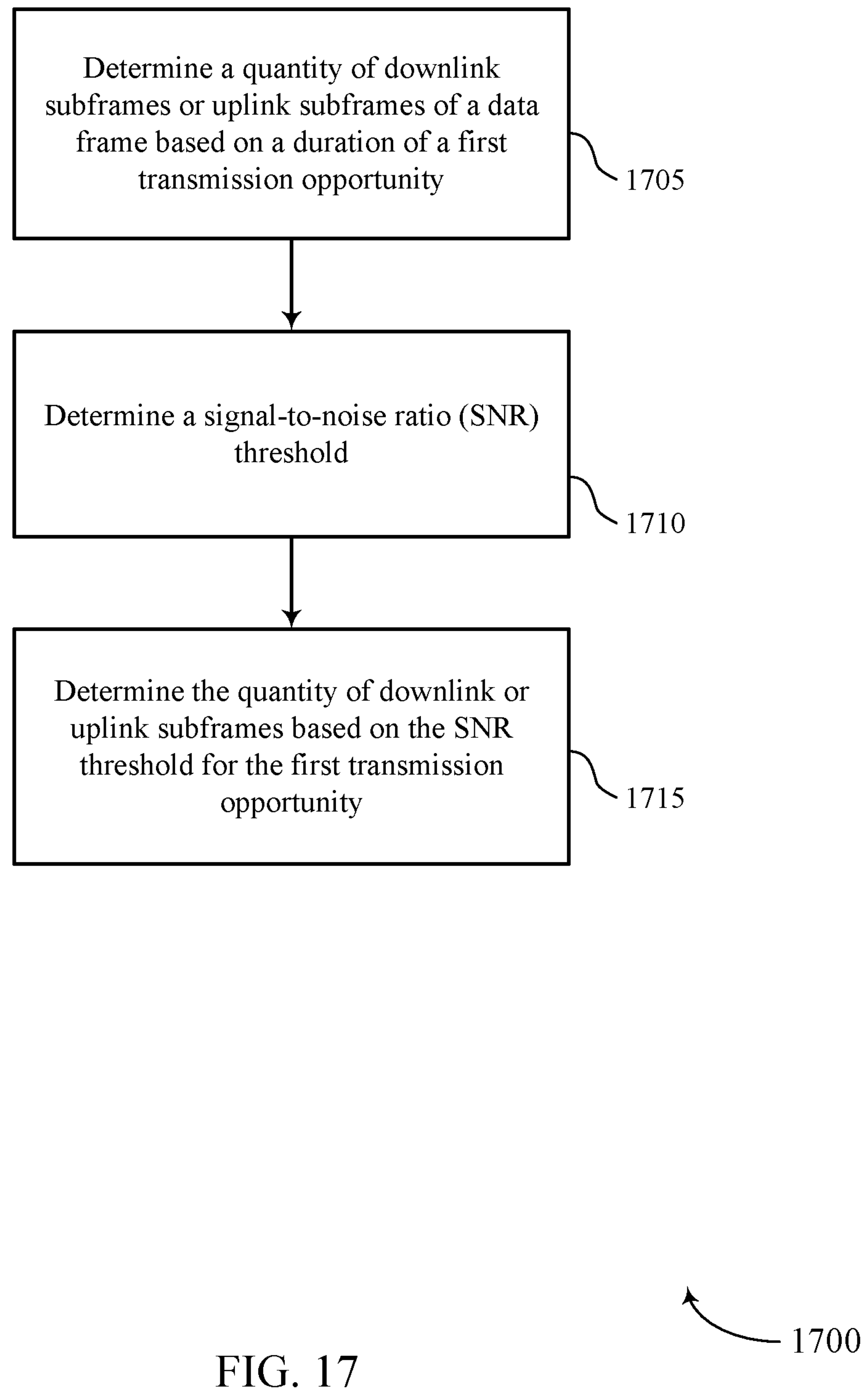

FIG. 17 illustrates a flowchart of a method 1700 for PDCCH and HARQ feedback for MuLTEfire coverage enhancement in accordance with aspects of the present disclosure. The operations of method 1700 may be implemented by a base station 105 or its components as described herein. For example, the operations of method 1700 may be performed by a base station coverage manager as described with reference to FIGS. 7 through 10. In some examples, a base station 105 may execute a set of codes to control the functional elements of the device to perform the functions described below. Additionally or alternatively, the base station 105 may perform aspects the functions described below using special-purpose hardware.

At block 1705 the base station 105 may determine a quantity of downlink subframes or uplink subframes of the data frame based on a duration of the first transmission opportunity. The operations of block 1705 may be performed according to the methods described with reference to FIGS. 1 through 6. In certain examples, aspects of the operations of block 1705 may be performed by a subframe determination component as described with reference to FIGS. 8 and 9.

At block 1710 the base station 105 may determine a SNR threshold. The operations of block 1710 may be performed according to the methods described with reference to FIGS. 1 through 6. In certain examples, aspects of the operations of block 1710 may be performed by a SNR component as described with reference to FIG. 9.

At block 1715 the base station 105 may determine the quantity of downlink or uplink subframes based on the SNR threshold for the first transmission opportunity. The operations of block 1715 may be performed according to the methods described with reference to FIGS. 1 through 6. In certain examples, aspects of the operations of block 1715 may be performed by a subframe determination component as described with reference to FIGS. 8 and 9.

Figure 18:
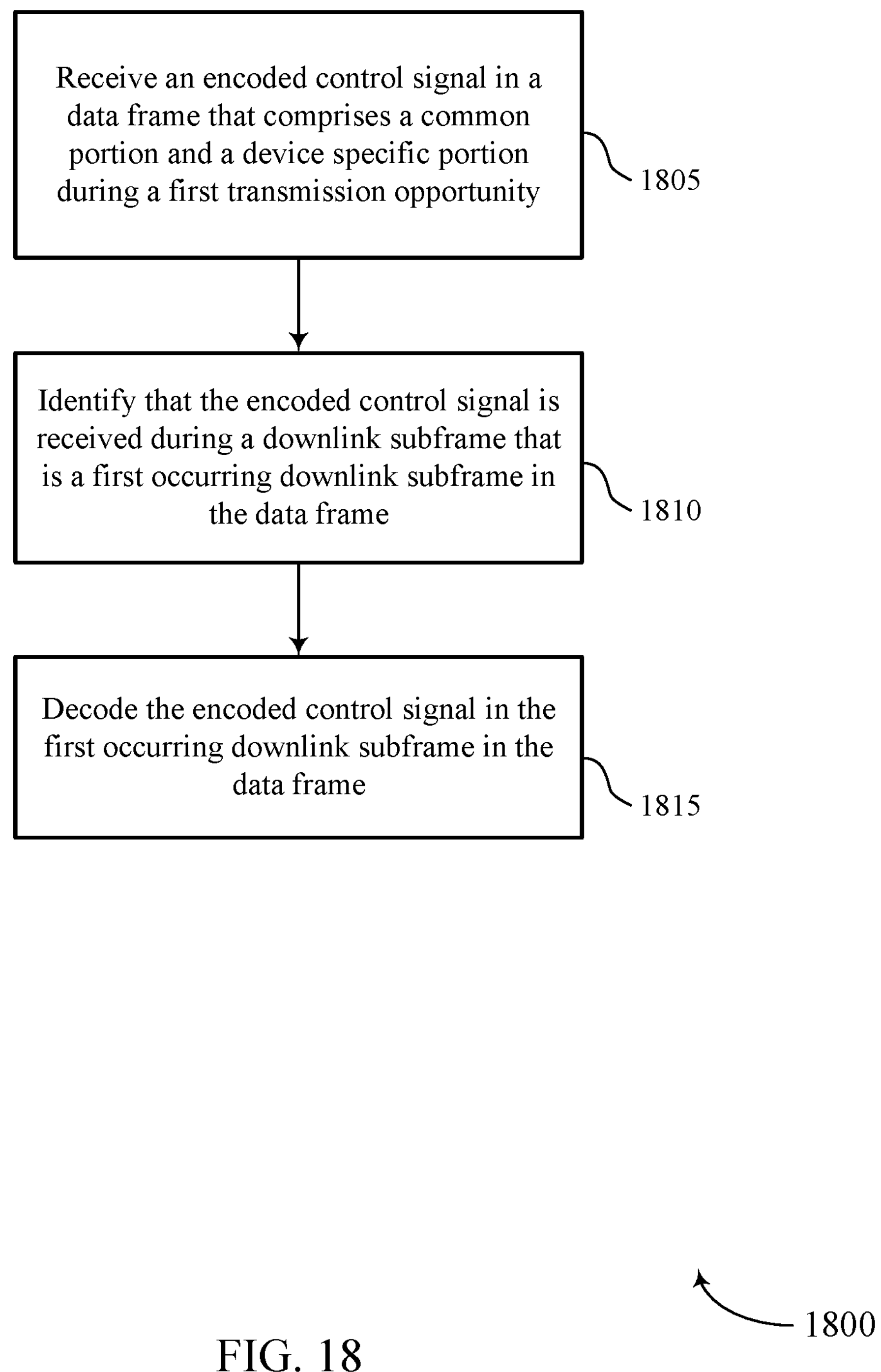

FIG. 18 illustrates a flowchart of a method 1800 for PDCCH and HARQ feedback for MuLTEfire coverage enhancement in accordance with aspects of the present disclosure. The operations of method 1800 may be implemented by a UE 115 or its components as described herein. For example, the operations of method 1800 may be performed by a UE coverage manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 1805 the UE 115 may receive an encoded control signal in a data frame that includes a common portion and a device specific portion during a first transmission opportunity. The operations of block 1805 may be performed according to the methods described with reference to FIGS. 1 through 6. In certain examples, aspects of the operations of block 1805 may be performed by a reception component as described with reference to FIGS. 12 and 13.

At block 1810 the UE 115 may identify that the encoded control signal is received during a downlink subframe that is a first occurring downlink subframe in the data frame. The operations of block 1810 may be performed according to the methods described with reference to FIGS. 1 through 6. In certain examples, aspects of the operations of block 1810 may be performed by a subframe determination component as described with reference to FIGS. 12 and 13.

At block 1815 the UE 115 may decode the encoded control signal in the first occurring downlink subframe in the data frame. The operations of block 1815 may be performed according to the methods described with reference to FIGS. 1 through 6. In certain examples, aspects of the operations of block 1815 may be performed by a decoding component as described with reference to FIGS. 12 and 13.

Figure 19:
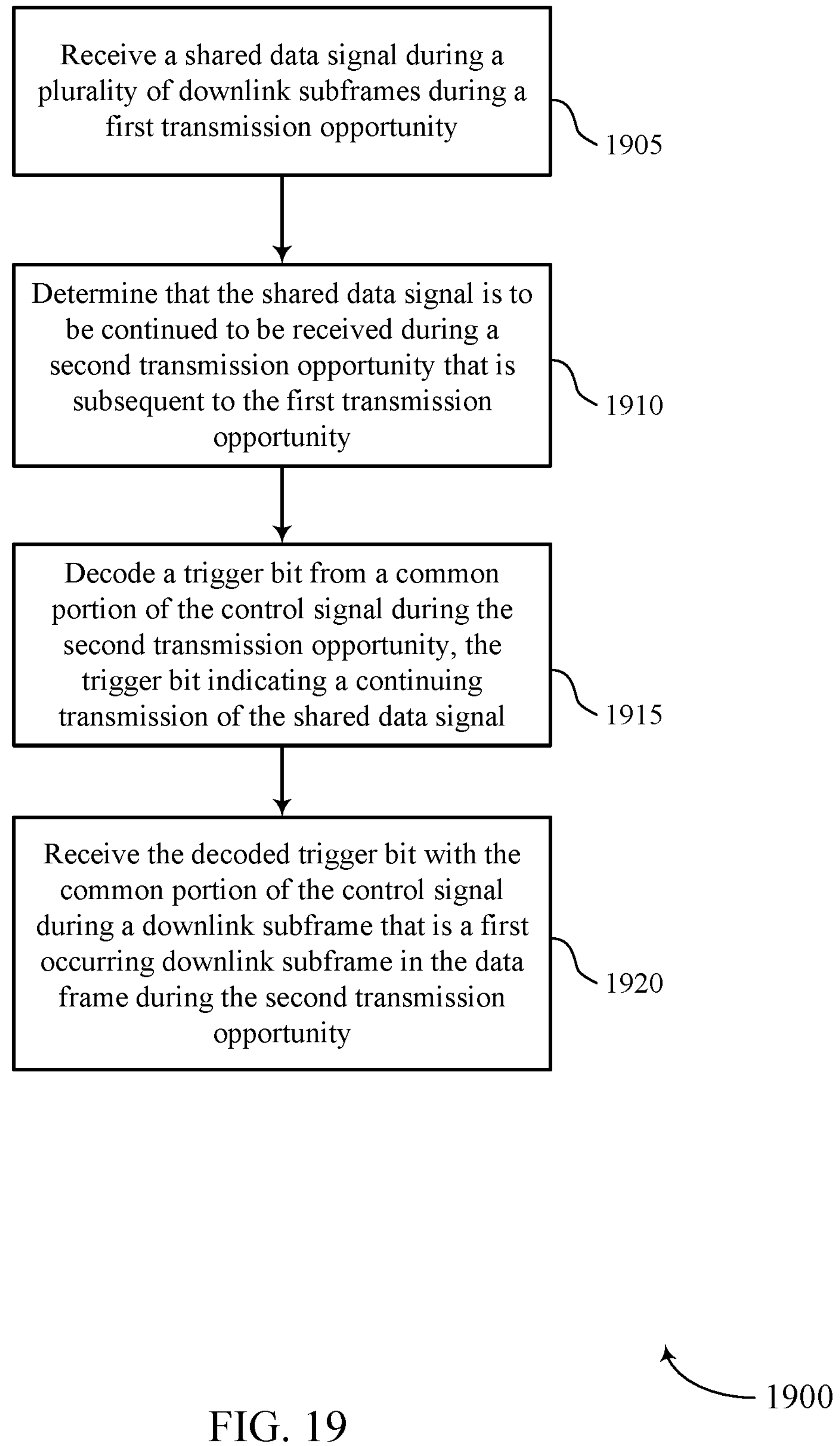

FIG. 19 illustrates a flowchart of a method 1900 for PDCCH and HARQ feedback for MuLTEfire coverage enhancement in accordance with aspects of the present disclosure. The operations of method 1900 may be implemented by a UE 115 or its components as described herein. For example, the operations of method 1900 may be performed by a UE coverage manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 1905 the UE 115 may receive a shared data signal during a plurality of downlink subframes during a first transmission opportunity. The operations of block 1905 may be performed according to the methods described with reference to FIGS. 1 through 6. In certain examples, aspects of the operations of block 1905 may be performed by a transmission opportunity component as described with reference to FIGS. 12 and 13.

At block 1910 the UE 115 may determine that the shared data signal is to be continued to be received during a second transmission opportunity that is subsequent to the first transmission opportunity. The operations of block 1910 may be performed according to the methods described with reference to FIGS. 1 through 6. In certain examples, aspects of the operations of block 1910 may be performed by a signal continuation component as described with reference to FIG. 13.

At block 1915 the UE 115 may decode a trigger bit from a common portion of the control signal during the second transmission opportunity, the trigger bit indicating a continuing transmission of the shared data signal. The operations of block 1915 may be performed according to the methods described with reference to FIGS. 1 through 6. In certain examples, aspects of the operations of block 1915 may be performed by a trigger component as described with reference to FIG. 13.

At block 1920 the UE 115 may receive the decoded trigger bit with the common portion of the control signal during a downlink subframe that is a first occurring downlink subframe in the data frame during the second transmission opportunity. The operations of block 1920 may be performed according to the methods described with reference to FIGS. 1 through 6. In certain examples, aspects of the operations of block 1920 may be performed by a trigger component as described with reference to FIG. 13.

Figure 20:
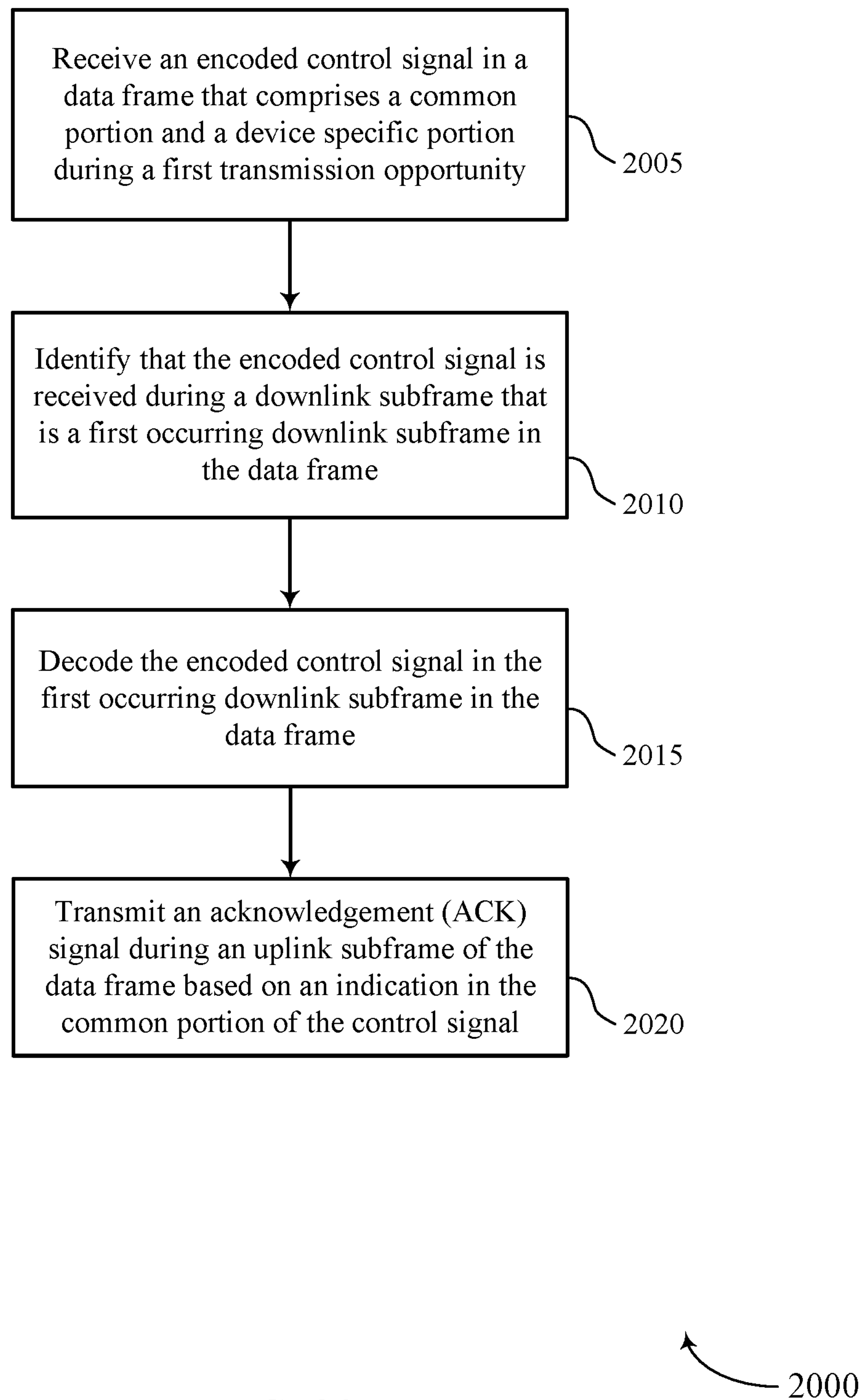

FIG. 20 illustrates a flowchart of a method 2000 for PDCCH and HARQ feedback for MuLTEfire coverage enhancement in accordance with aspects of the present disclosure. The operations of method 2000 may be implemented by a UE 115 or its components as described herein. For example, the operations of method 2000 may be performed by a UE coverage manager as described with reference to FIGS. 11 through 14. In some examples, a UE 115 may execute a set of codes to control the functional elements of the device to perform the functions described below. Additionally or alternatively, the UE 115 may perform aspects the functions described below using special-purpose hardware.

At block 2005 the UE 115 may receive an encoded control signal in a data frame that includes a common portion and a device specific portion during a first transmission opportunity. The operations of block 2005 may be performed according to the methods described with reference to FIGS. 1 through 6. In certain examples, aspects of the operations of block 2005 may be performed by a reception component as described with reference to FIGS. 12 and 13.

At block 2010 the UE 115 may identify that the encoded control signal is received during a downlink subframe that is a first occurring downlink subframe in the data frame. The operations of block 2010 may be performed according to the methods described with reference to FIGS. 1 through 6. In certain examples, aspects of the operations of block 2010 may be performed by a subframe determination component as described with reference to FIGS. 12 and 13.

At block 2015 the UE 115 may decode the encoded control signal in the first occurring downlink subframe in the data frame. The operations of block 2015 may be performed according to the methods described with reference to FIGS. 1 through 6. In certain examples, aspects of the operations of block 2015 may be performed by a decoding component as described with reference to FIGS. 12 and 13.

At block 2020 the UE 115 may transmit an ACK signal during an uplink subframe of the data frame based on an indication in the common portion of the control signal. The operations of block 2020 may be performed according to the methods described with reference to FIGS. 1 through 6. In certain examples, aspects of the operations of block 2020 may be performed by a transmission opportunity component as described with reference to FIGS. 12 and 13.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, the system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, the method comprising:

assigning a downlink subframe that is a first occurring downlink subframe in a data frame;

transmitting an encoded control signal during a first transmission opportunity, the encoded control signal comprising a common portion for receiving devices, the common portion indicating a structure of the data frame, the encoded control signal further comprising a device specific portion for a specific receiving device, the device specific portion indicating uplink grants and downlink grants during the data frame for the specific receiving device, wherein at least the common portion of the encoded control signal is transmitted during the downlink subframe;

transmitting a shared data signal during a plurality of downlink subframes during the first transmission opportunity; and transmitting the shared data signal during a second transmission opportunity that is subsequent to the first transmission opportunity.

2. The method of claim 1, further comprising:

associating a trigger bit with the common portion of the encoded control signal, the trigger bit indicating a continuing transmission of the shared data signal; and transmitting the trigger bit with the common portion of the encoded control signal during a downlink subframe that is a first occurring downlink subframe in the data frame during the second transmission opportunity.

3. The method of claim 1, further comprising:

associating a trigger bit with the common portion of the encoded control signal, the trigger bit indicating a continuing reception of the shared data signal; and transmitting the trigger bit with the common portion of the encoded control signal during a downlink subframe that is a first occurring downlink subframe in the data frame during the second transmission opportunity.

4. The method of claim 1, wherein the device specific portion of the encoded control signal indicates a quantity of repetitive transmissions of a shared data signal that occurs during downlink subframes.

5. The method of claim 4, wherein the shared data signal comprises a physical downlink shared channel (PDSCH).

6. The method of claim 1, wherein the common portion of the encoded control signal identifies an uplink subframe of the data frame during which a receiving device is to transmit an acknowledgement (ACK) signal.

7. The method of claim 1, further comprising:

determining a quantity of downlink subframes or uplink subframes of the data frame based at least in part on a duration of the first transmission opportunity.

8. The method of claim 7, wherein determining the quantity of downlink subframes or uplink subframes of the data frame is based at least in part on a subframe configuration parameter.

9. The method of claim 8, wherein determining the number of downlink subframes or uplink subframes of the data frame further comprises:

determining a signal-to-noise ratio (SNR) threshold; and determining the quantity of downlink or uplink subframes based at least in part on the SNR threshold.

10. The method of claim 1, wherein the encoded control signal is an enhanced machine-type physical downlink control channel (eMPDCCH).

11. The method of claim 1, wherein the common portion and the device specific portion comprise at least one of a physical downlink control channel (PDCCH), an enhanced machine-type PDCCH (eMPDCCH), and a common eMPDCCH (CeMPDCCH), or a combination thereof.

12. The method of claim 1, further comprising:

assigning a set size of the data frame to a predetermined number of physical resource block pairs based at least in part on an aggregation level.

13. The method of claim 12, wherein the predetermined number of physical resource block pairs is 32.

14. The method of claim 12, wherein the aggregation level is 64 or higher.

15. A method for wireless communication at a user equipment, the method comprising:

receiving an encoded control signal in a data frame that comprises a common portion and a device specific portion during a first transmission opportunity;

identifying that the encoded control signal is received during a downlink subframe that is a first occurring downlink subframe in the data frame;

decoding the encoded control signal in the first occurring downlink subframe in the data frame by decoding the common portion that indicates the structure of the data frame and decoding the device specific portion that indicates uplink grants and downlink grants during the data frame.

16. The method of claim 15, further comprising:

receiving a shared data signal during a plurality of downlink subframes during the first transmission opportunity; and receiving the shared data signal during a second transmission opportunity that is subsequent to the first transmission opportunity.

17. The method of claim 16, wherein receiving the shared data signal further comprises:

decoding a trigger bit from the common portion of the encoded control signal during the second transmission opportunity, the trigger bit indicating a continuing transmission of the shared data signal; and receiving the decoded trigger bit with the common portion of the encoded control signal during a downlink subframe that is a first occurring downlink subframe in the data frame during the second transmission opportunity.

18. The method of claim 15, wherein the device specific portion of the encoded control signal indicates a quantity of repetitive transmissions of a shared data signal that occurs during downlink subframes.

19. The method of claim 18, wherein the shared data signal comprises a physical downlink shared channel (PDSCH).

20. The method of claim 19, further comprising:

receiving a quantity of repetitive transmissions of PDSCH during downlink subframes of the data frame based at least in part on the device specific portion of the encoded control signal.

21. The method of claim 15, further comprising:

transmitting an acknowledgement (ACK) signal during an uplink subframe of the data frame based at least in part on an indication in the common portion of the encoded control signal.

22. An apparatus for wireless communication, the apparatus comprising:

a processor;

memory in electronic communication with the processor; and the processor and memory configured to:

assign a downlink subframe that is a first occurring downlink subframe in a data frame;

transmit an encoded control signal during a first transmission opportunity, the encoded control signal comprising a common portion for receiving devices, the common portion indicating a structure of the data frame, the encoded control signal further comprising a device specific portion for a specific receiving device, the device specific portion indicating uplink grants and downlink grants during the data frame for the specific receiving device, wherein at least the common portion of the encoded control signal is transmitted during the downlink subframe;

transmit a shared data signal during a plurality of downlink subframes during the first transmission opportunity; and transmit the shared data signal during a second transmission opportunity that is subsequent to the first transmission opportunity.

23. The apparatus of claim 22, wherein the processor and memory are further configured to:

associate a trigger bit with the common portion of the encoded control signal, the trigger bit indicating a continuing transmission of the shared data signal; and transmit the trigger bit with the common portion of the encoded control signal during a downlink subframe that is a first occurring downlink subframe in the data frame during the second transmission opportunity.

24. The apparatus of claim 22, wherein the processor and memory are further configured to:

associate a trigger bit with the common portion of the encoded control signal, the trigger bit indicating a continuing reception of the shared data signal; and transmit the trigger bit with the common portion of the encoded control signal during a downlink subframe that is a first occurring downlink subframe in the data frame during the second transmission opportunity.

25. The apparatus of claim 22, wherein the device specific portion of the encoded control signal indicates a quantity of repetitive transmissions of a shared data signal that occurs during downlink subframes.

26. The apparatus of claim 25, wherein the shared data signal comprises a physical downlink shared channel (PDSCH).

27. The apparatus of claim 22, wherein the common portion of the encoded control signal identifies an uplink subframe of the data frame during which a receiving device is to transmit an acknowledgement (ACK) signal.

28. The apparatus of claim 22, wherein the processor and memory are further configured to:

determine a quantity of downlink subframes or uplink subframes of the data frame based at least in part on a duration of the first transmission opportunity.

29. The apparatus of claim 28, wherein determining the quantity of downlink subframes or uplink subframes of the data frame is based at least in part on a subframe configuration parameter.

30. The apparatus of claim 29, wherein the processor and memory are further configured to:

determine a signal-to-noise ratio (SNR) threshold; and determine the quantity of downlink or uplink subframes based at least in part on the SNR threshold.

31. The apparatus of claim 22, wherein the encoded control signal is an enhanced machine-type physical downlink control channel (eMPDCCH).

32. The apparatus of claim 22, wherein the common portion and the device specific portion comprise at least one of a physical downlink control channel (PDCCH), an enhanced machine-type PDCCH (eMPDCCH), and a common eMPDCCH (CeMPDCCH), or a combination thereof.

33. The apparatus of claim 22, wherein the processor and memory are further configured to:

assign a set size of the data frame to a predetermined number of physical resource block pairs based at least in part on an aggregation level.

34. The apparatus of claim 33, wherein the predetermined number of physical resource block pairs is 32.

35. The apparatus of claim 34, wherein the aggregation level is 64 or higher.

36. An apparatus for wireless communication, the apparatus comprising:

a processor;

memory in electronic communication with the processor; and the processor and memory configured to:

receive an encoded control signal in a data frame that comprises a common portion and a device specific portion during a first transmission opportunity;

identify that the encoded control signal is received during a downlink subframe that is a first occurring downlink subframe in the data frame; and decode the encoded control signal in the first occurring downlink subframe in the data frame by decoding the common portion that indicates the structure of the data frame and decoding the device specific portion that indicates uplink grants and downlink grants during the data frame.

37. The apparatus of claim 36, wherein the processor and memory are further configured to:

receive a shared data signal during a plurality of downlink subframes during the first transmission opportunity; and receiving the shared data signal during a second transmission opportunity that is subsequent to the first transmission opportunity.

38. The apparatus of claim 37, wherein the processor and memory are further configured to:

decode a trigger bit from the common portion of the encoded control signal during the second transmission opportunity, the trigger bit indicating a continuing transmission of the shared data signal; and receive the decoded trigger bit with the common portion of the encoded control signal during a downlink subframe that is a first occurring downlink subframe in the data frame during the second transmission opportunity.

39. The apparatus of claim 36, wherein the device specific portion of the encoded control signal indicates a quantity of repetitive transmissions of a shared data signal that occurs during downlink subframes.

40. The apparatus of claim 39, wherein the shared data signal comprises a physical downlink shared channel (PDSCH).

41. The apparatus of claim 40, wherein the processor and memory are further configured to:

receive a quantity of repetitive transmissions of PDSCH during downlink subframes of the data frame based at least in part on the device specific portion of the encoded control signal.

42. The apparatus of claim 36, wherein the processor and memory are further configured to:

transmit an acknowledgement (ACK) signal during an uplink subframe of the data frame based at least in part on an indication in the common portion of the encoded control signal.

43. A non-transitory computer readable medium storing code for wireless communication at a base station, the code comprising instructions executable by a processor to cause the base station to:

assign a downlink subframe that is a first occurring downlink subframe in a data frame;

transmit an encoded control signal during a first transmission opportunity, the encoded control signal comprising a common portion for receiving devices, the common portion indicating a structure of the data frame, the encoded control signal further comprising a device specific portion for a specific receiving device, the device specific portion indicating uplink grants and downlink grants during the data frame for the specific receiving device, wherein at least the common portion of the encoded control signal is transmitted during the downlink subframe;

transmit a shared data signal during a plurality of downlink subframes during the first transmission opportunity; and transmit the shared data signal during a second transmission opportunity that is subsequent to the first transmission opportunity.

44. A non-transitory computer readable medium storing code for wireless communication at a user equipment, the code comprising instructions executable by a processor to cause the user equipment to:

receive an encoded control signal in a data frame that comprises a common portion and a device specific portion during a first transmission opportunity;

identify that the encoded control signal is received during a downlink subframe that is a first occurring downlink subframe in the data frame; and decode the encoded control signal in the first occurring downlink subframe in the data frame by decoding the common portion that indicates the structure of the data frame and decoding the device specific portion that indicates uplink grants and downlink grants during the data frame.

* * * * *